US010782446B2

(12) United States Patent
Li et al.

(10) Patent No.: US 10,782,446 B2
(45) Date of Patent: Sep. 22, 2020

(54) ENVIRONMENTAL LOGGING SYSTEM

(71) Applicant: The Regents of the University of Michigan, Ann Arbor, MI (US)

(72) Inventors: Tao Li, Ann Arbor, MI (US); Yogesh Gianchandani, Ann Arbor, MI (US); Yu Sui, Ann Arbor, MI (US); Ryan Meredith, Troy, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 569 days.

(21) Appl. No.: 15/410,724

(22) Filed: Jan. 19, 2017

(65) Prior Publication Data
US 2017/0205533 A1 Jul. 20, 2017

Related U.S. Application Data

(60) Provisional application No. 62/280,353, filed on Jan. 19, 2016.

(51) Int. Cl.
*G01V 11/00* (2006.01)
(52) U.S. Cl.
CPC .................. *G01V 11/002* (2013.01)
(58) Field of Classification Search
CPC ................................................ G01V 11/002
See application file for complete search history.

(56) References Cited

U.S. PATENT DOCUMENTS

2014/0120972 A1* 5/2014 Hartman ............... H04W 88/02
455/509
2014/0290381 A1 10/2014 Manohara et al.

FOREIGN PATENT DOCUMENTS

JP        08199513 A  *  8/1996
WO        WO0195686 A2    12/2001

OTHER PUBLICATIONS

DeHennis, "A Wireless Microsystem for the Remote Sensing of Pressure, Temperature, and Relative Humidity", Journal of Microelectromechanical Systems, vol. 14, No. 1, Feb. 2005, 11 pages.

(Continued)

*Primary Examiner* — Walter L Lindsay, Jr.
*Assistant Examiner* — Milton Gonzalez
(74) *Attorney, Agent, or Firm* — Kelly Kordzik; Matheson Keys & Kordzik PLLC

(57) ABSTRACT

An environmental logging system that includes a housing and an electronic logging circuit sealed within the housing. The logging circuit includes an energy source, transducer, charging circuit, trigger circuit, electronic control unit (ECU), and transmitter. The energy source is charged by the charging circuit using electricity from the transducer in response to external energy applied to the transducer. Commands may also be received by the circuit via the transducer. The ECU includes a processor, memory, and one or more sensors, and it operates under power from the energy source to store data from the sensor(s). The transmitter is coupled to the ECU and transmits the data via electromagnetic radiation outside the housing. The trigger circuit supplies operating power to the processor only when the voltage level of the energy source is above a minimum threshold. The housing may be a tubular shell filled with a polymeric material.

21 Claims, 17 Drawing Sheets

(56) References Cited

OTHER PUBLICATIONS

Mengjiao Yu, "A Distributed Microchip System for Subsurface Measurement", Oct. 8-10, 2012, 22 pages.
Zhaorui Shi, "Development and Field Evaluation of a Distributed Microchip Downhole Measurement", Mar. 3-5, 2015, 14 pages.

* cited by examiner

ENVIRONMENTAL LOGGING SYSTEM

CROSS-REFERENCE TO RELATED APPLICATION

This application claims the benefit of U.S. Provisional Patent Application No. 62/280,353 filed Jan. 19, 2016, the entire contents of which are hereby incorporated by reference.

TECHNICAL FIELD

The invention relates to small scale recording devices for logging environmental conditions and which can be used in fluids and environments that may involve a significant range of temperatures and pressures.

BACKGROUND

Environmental logging microsystems (ELMs) of the type described herein may be deployed into environments where they will sense and store data that can thereafter be retrieved for analysis and reporting. One such application of the ELMs is in oilfield wellbores where the ELMs may be subjected to high temperatures and pressures.

SUMMARY

In accordance with an aspect of the invention, there is provided an environmental logging system that includes a housing and an electronic logging circuit located within the housing. The logging circuit includes an energy source, transducer, charging circuit, electronic control unit (ECU), and a trigger circuit. The energy source supplies electricity to power the logging circuit. The transducer that converts external energy applied to the transducer into electricity, and the charging circuit couples the transducer to the energy source such that the transducer charges the energy source when the transducer is subjected to the external energy. The ECU operates from the electricity supplied by the energy source and includes a processor, non-volatile memory, and one or more sensors, each of which detects an environmental condition and provides a sensor signal indicative of a value of the environmental condition. The ECU operates under control of a program to store in the non-volatile memory data representative of the sensor signal(s). The trigger circuit operates from the electricity supplied by the energy source and is coupled to the ECU. The energy source provides the electricity at different voltage levels depending on a state of charge of the energy source and the processor is rated for normal operation at voltages above a minimum operating voltage and draws more power at some voltages under the minimum operating voltage. The trigger circuit inhibits power draw by the processor at voltages under the minimum operating voltage. This helps avoid wasted power consumption by the processor when the state of charge of the energy source is below the minimum operating voltage of the processor.

In accordance with another aspect of the invention, there is provided an environmental logging system that includes a housing and an electronic logging circuit carried by the housing. The logging circuit includes an energy source, transducer, charging circuit, ECU, and transmitter. The charging circuit interconnects the energy source and transducer, and the energy source is charged by the charging circuit using electricity from the transducer in response to external energy applied to the transducer. The ECU includes a processor, memory, and one or more sensors, wherein the ECU operates under power from the energy source to store data from the sensor(s). The transmitter is coupled to the ECU and transmits electromagnetic radiation outside the housing. The ECU is coupled to the transducer and is configured to detect electricity from the transducer that is indicative of pulses of external energy impinging on the transducer. The ECU is configured to respond to one or more commands encoded by the pulses to change operating states between a sleep state, detection state, and readout state. And the ECU is configured to record data from the one or more sensors when in the detection state and to send data via the transmitter when in the readout state.

In accordance with yet another aspect of the invention, there is provided an environmental logging system that includes a housing and an electronic logging circuit carried by the housing. The logging circuit includes an energy source, transducer, charging circuit, and ECU. The charging circuit interconnects the energy source and transducer, and the energy source is charged by the charging circuit using electricity from the transducer in response to external energy applied to the transducer. The ECU includes a processor, memory, and one or more sensors, wherein the ECU operates under power from the energy source to store data from the sensor(s). The housing comprises a tubular shell filled with a polymeric material that seals the logging circuit within the shell.

BRIEF DESCRIPTION OF THE DRAWINGS

Preferred exemplary embodiments will hereinafter be described in conjunction with the appended drawings, wherein like designations denote like elements, and wherein.

DETAILED DESCRIPTION OF THE ILLUSTRATED EMBODIMENTS

Figure 1:
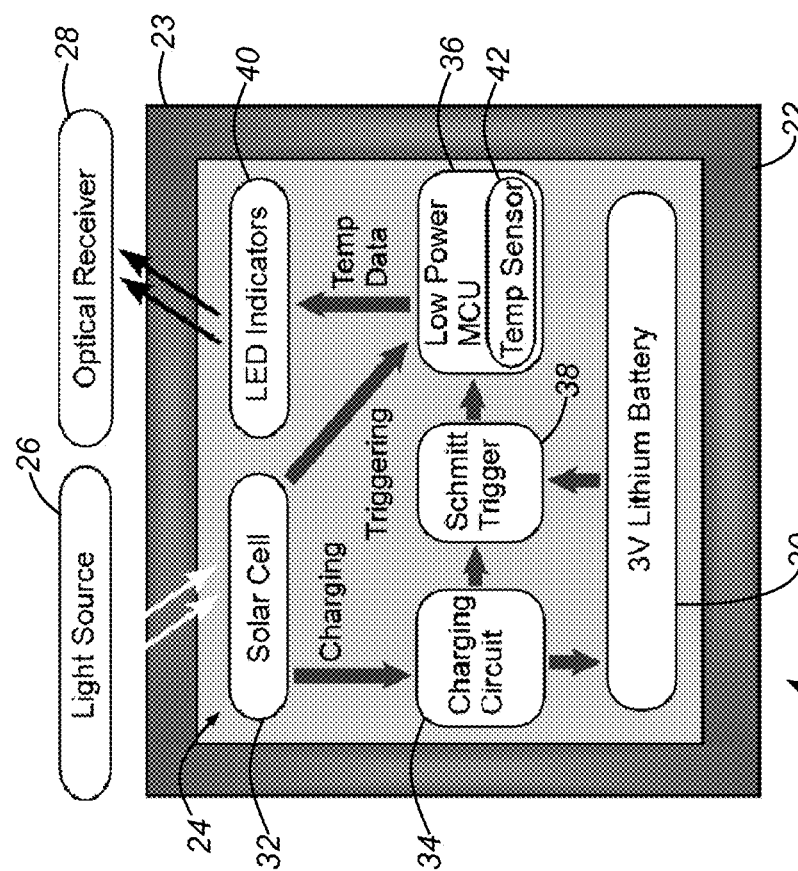
FIG. 1 is a block diagram of a first embodiment of an environmental logging microsystem (ELM) constructed in accordance with the present invention.

Shown in FIG. 1 is an embodiment of an electronic logging microsystem (ELM), designated generally as ELM 20. ELM 20 includes a housing 22 with an electronic logging circuit in the form of an ELM circuit 24 that is hermetically sealed within the housing 22. An external light source 26 provides charging energy to the ELM 20 as well as encoded commands that cause ELM 20 to switch between various states, including a sleep state, detection state, and readout state. An external optical receiver 28 is used to read light pulses emitted from the ELM 20 for readout of stored data. These and other features will be described below.

At least a portion of housing 22 is transmissive to electromagnetic radiation which allows energy from the light source 26 to be received by the ELM circuit 24. For example, the housing 22 may include an optically transmissive lid 23 that functions as an optical window for wireless charging by the light source 26. This also allows signaling light from the ELM circuit 24 to be transmitted out of the housing for purposes of readout by the receiver 28. The ELM circuit 24 includes an energy source such as a battery 30, a transducer such as a solar cell 32 that converts the received light from light source 26 into electricity, a charging circuit 34 connected to the solar cell 32 for recharging the battery 30, an electronic control unit (ECU) 36 that is used for recording and readout of environmental data, a trigger circuit 38 that controls the energizing of the ECU 36 based on the state of charge of battery 30, and one or more electromagnetic radiation transmitters such as LEDs 40 that provide detectable light out of the housing 22 for receipt by the optical receiver 28.

Figure 2:
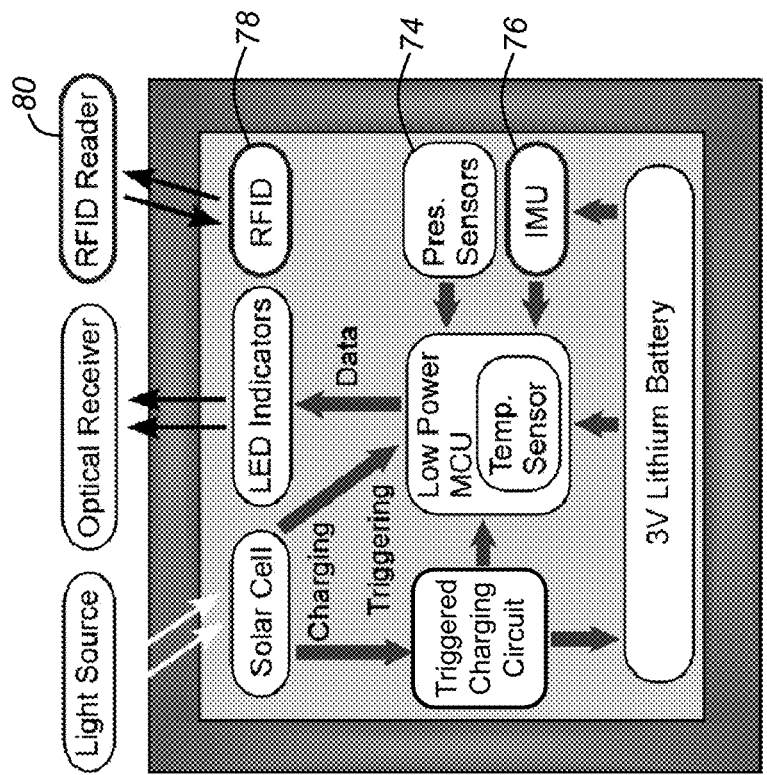
FIG. 2 is a block diagram of a second embodiment of an ELM constructed in accordance with the present invention.

ECU 36 may include a processor and/or non-volatile memory (not shown) as well as one or more sensors 42, each of which detects an environmental condition (e.g., temperature, pressure, etc.) and provides a sensor signal indicative of a value of the environmental condition. The ECU 36 may operate under control of a control program stored in memory (e.g., in the non-volatile memory) to receive and store in the non-volatile memory data representative of the sensor signals. In the exemplary embodiment shown in FIG. 1, a temperature sensor 42 is utilized and is included within a low power microcontroller unit (MCU) that comprises the ECU 36. In other embodiments, such as shown in FIG. 2, the ECU may comprise a processor with memory, such as the same MCU as in FIG. 1, as well as additional sensors for other readings such as pressure and acceleration. In other embodiments, the processor can be a component that is separate from any of the sensors or even separate from the memory used for storing the control program and sensor data.

FIG. 2 depicts an ELM 50 which can be implemented using the same or similar circuits to that of FIG. 1, but may include other components and capabilities. Thus, the various aspects of the construction and operation of ELM 20 discussed herein apply to ELM 50 as well, except where specific differences or variations are described. One such difference or variation is that ELM 50 has additional sensors including one or more pressure sensors 74 and an inertial measurement unit (IMU) 76 that can provide three-axis acceleration and magnetic compass directionality data. It also includes an RFID tag 78 that permits each such ELM to be uniquely identified from other ELMs in use via an external RFID reader 80. Details of the construction of ELMs 20 and 50 will be described below in greater detail.

Figure 3:
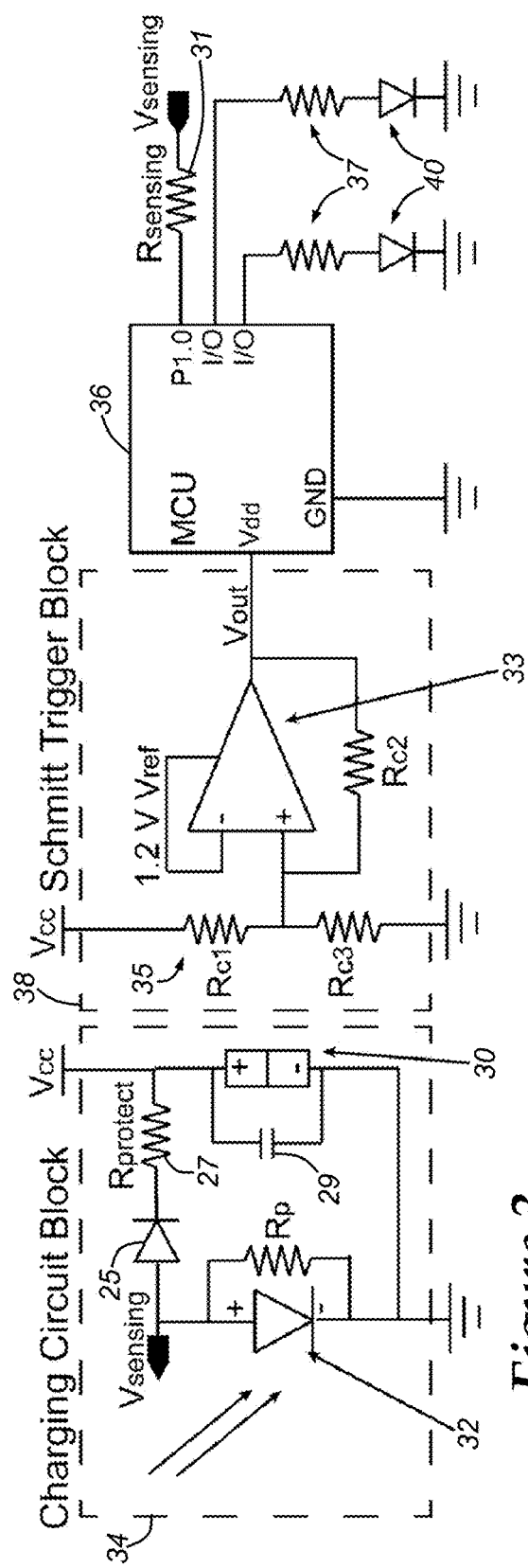
FIG. 3 is a schematic diagram of an electronic logging circuit used in the ELM of FIG. 1.

Referring now to FIG. 3, there is shown ELM circuit 24. This circuit includes a charging circuit block that comprises the battery 30, solar cell 32, and charging circuit 34. Battery 30 may be a rechargeable lithium battery (e.g., 3 volts; model no. MS412FE, commercially available from Seiko Instruments Inc.). Solar cell 32 may be a monolithic photovoltaic cell (e.g., 4 volts output; model no. CPC1822 commercially available from Clare™), which is connected to battery 30 via a diode 25 and overcurrent protection resistor 27. A capacitor 29 connected in parallel with the battery 30 stores additional charge to help handle large transient current needs of the ELM circuit 24. ECU 36 may comprise a MCU (e.g., model no. C8051F990 commercially available from Silicon Labs), which is a packaged integrated circuit that includes a 25 MHz processor with onboard memory, temperature sensor, an input coupled to the solar cell 32 for optical triggering of the ELM, and outputs connected to the LEDs 40 for data readout.

Operating power is supplied to the ECU 36 via the trigger circuit 38, which may be implemented as a Schmitt trigger that inhibits operating power to the ECU unless the battery 30 is at a suitably predetermined high state of charge. As will be discussed below, this prevents the draw of power from the MCU at operating voltages (Vdd) below its minimum rating. Schmitt trigger circuit 38 monitors battery voltage (Vcc) against a reference voltage ($V_{ref}$) using a comparator (e.g., model no. TLV3012, commercially available from Texas Instruments) with positive feedback via voltage dividing resistors ($R_{c1}$, $R_{c2}$, $R_{c3}$) selected to maintain the output (Vow) grounded unless the battery voltage (Vcc) is at least at a predetermined threshold voltage (e.g., about 2.0 volts). By inhibiting power draw from the MCU when the battery voltage (Vcc) is below the minimum operating voltage (Vdd) of the MCU, the trigger circuit 38 helps avoid undesirable draining of battery 30, thereby extending the time required between recharging of the battery 30.

Those skilled in the art will recognize that the above-described components of ELM circuit 24 may all comprise commercial off-the-shelf components. Furthermore, as will be described below, the design of ELM circuit 24, including programming of the ECU 36, enables operation of the ELM 20 and ELM 50 at temperatures exceeding the individual maximum temperature ratings of at least some of the components.

Another feature of ELM circuit 24 is the connection of the solar cell 32 to an input ($V_{sensing}$) of the ECU 36 via a sensing resistor ($R_{sensing}$) 31. With suitable programming of the ECU 36, this permits externally-sourced commands to be encoded into light pulses that are directed by the light source 26 onto the solar cell 32 and then read by the ECU 36. Thus, the ECU 36 may be configured to detect electricity from the solar cell 32 that is indicative of the impinging light pulses, and is configured to respond to one or more commands encoded in the light pulses to change operating states (e.g., between a sleep state, detection state, readout state, etc.). The ECU 36 may be configured to record data from the one or more sensors 42 when in the detection state and to send data via the LEDs 40 when in the readout state. These and other operating states of the ECU 36 will be described in greater detail below in connection with specific implementations of ELM 20 and ELM 50.

Figure 5:
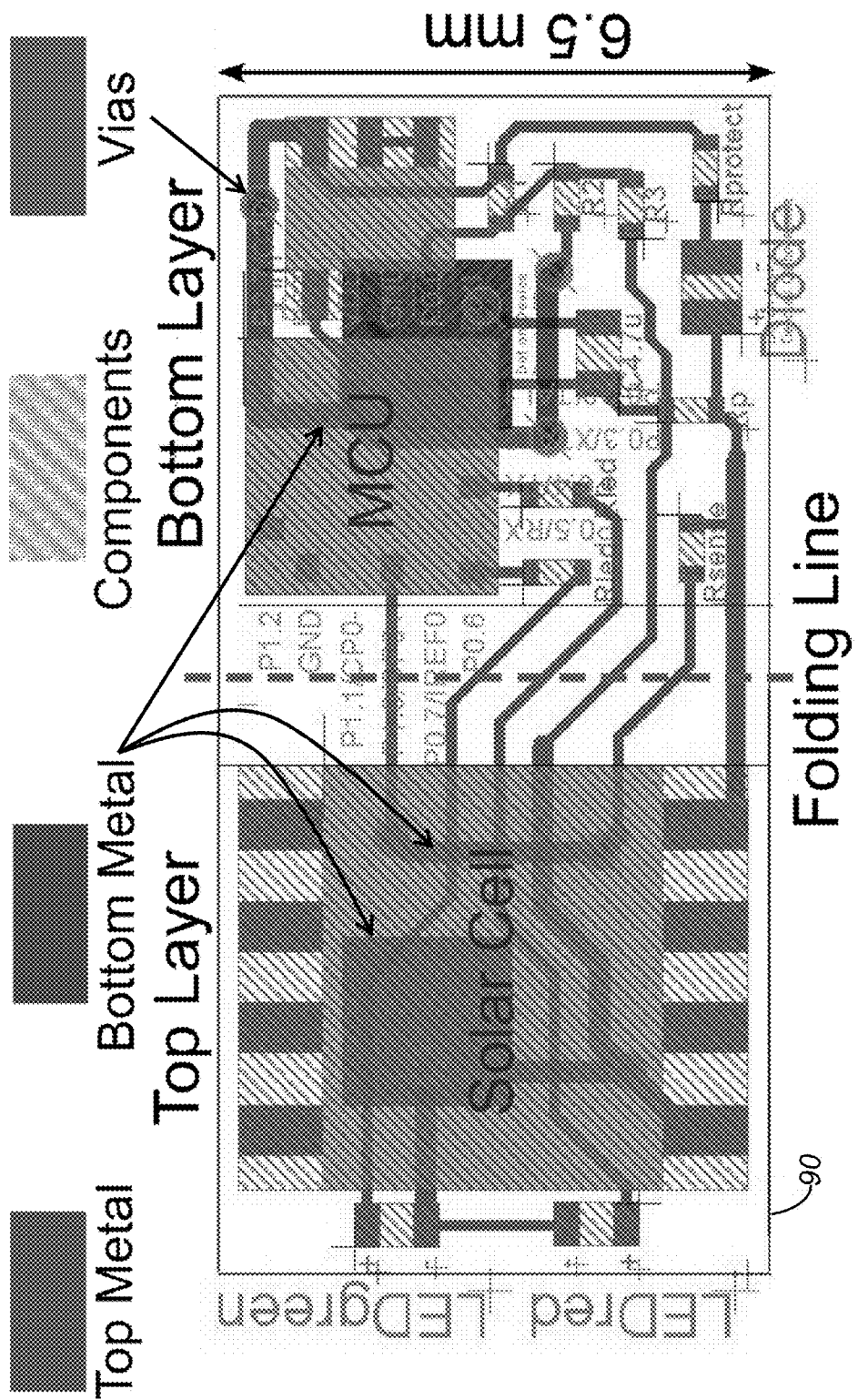
FIGS. 5 and 6 diagrammatically illustrate an exemplary physical component layout of the logging circuit of FIG. 3 on a printed circuit board in both a flat (FIG. 5) and folded (FIG. 6) condition.
Figure 6:
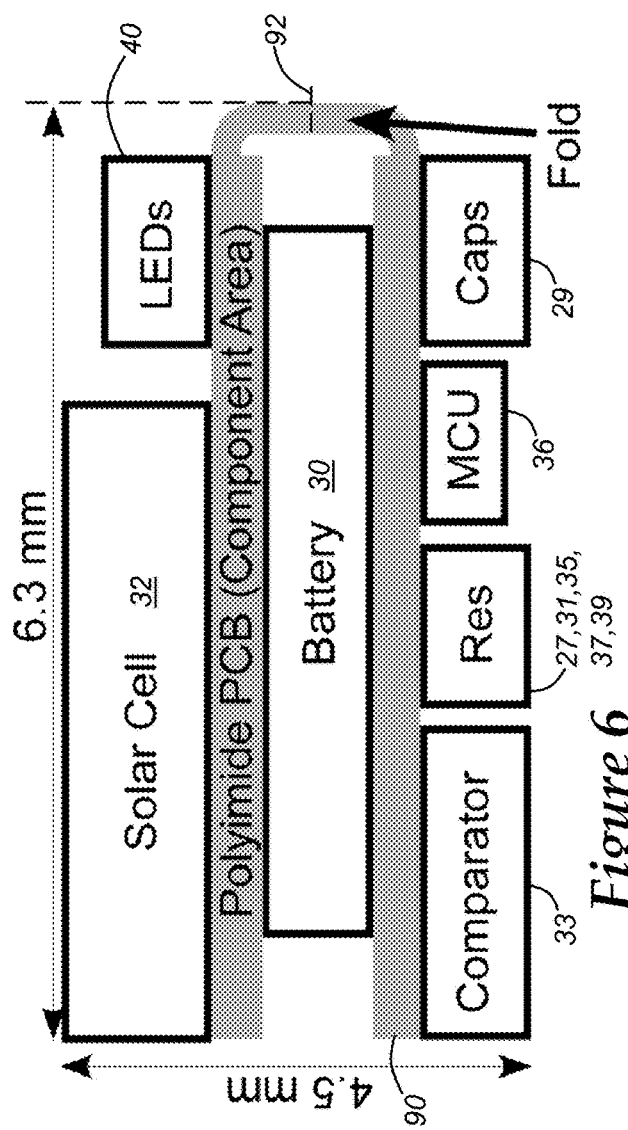
Figure 7A:
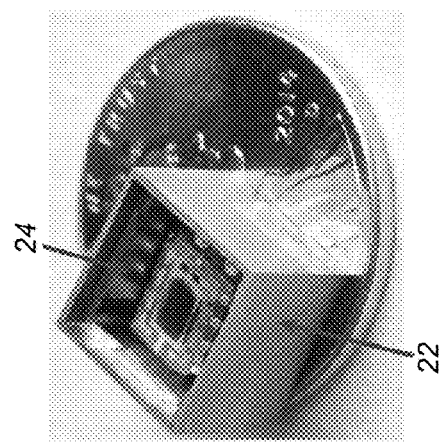
FIGS. 7A and 7B are images of actual prototypes showing the manufactured logging circuit of FIGS. 3 and 5-6 prior to folding of the printed circuit board (FIG. 7A) and after folding when incorporated into a housing (FIG. 7B)
Figure 7B:
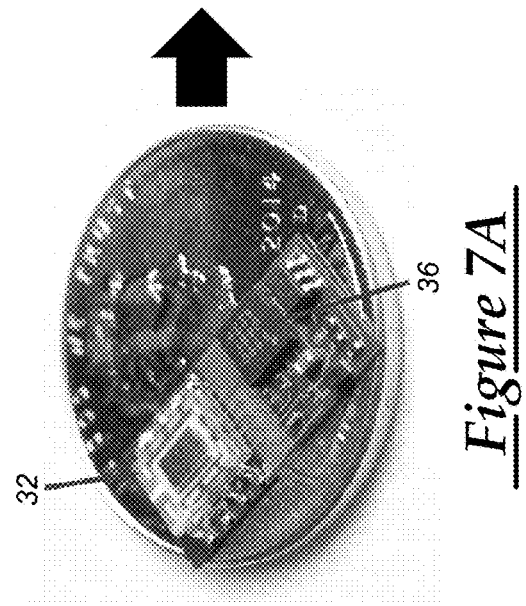

Referring now also to FIGS. 5-7B, there will be described the design, features, and use of embodiments of ELM 20 and ELM 50, which may function as a temperature logger with data storage and communication capabilities. FIGS. 5 and 6 depict the PCB 90 and system component placement and folding along a folding line 92 into a compact package. FIGS. 7A and 7B show a prototype assembled circuit both before (FIG. 7A) and after (FIG. 7B) folding along the folding line 92 and placement into the housing 22. An optically transmissive (e.g., made of sapphire) lid 23 (not shown in FIG. 7B) is then hermetically sealed over the opening to form a completed housing 22 having an optical window through which light may pass for charging, signaling, and readout of data. For example, the ELM circuit 24 may be encapsulated in a stainless steel shell 22 (e.g., an 8 mm package) and an optically transmissive sapphire lid 23 (not shown in FIG. 7B). The MCU used for ECU 36 may be responsible for functional control, data storage and communication, and system power management. The solar cell 32 may be used for wireless charging of the battery 30, for optical triggering of the system functions during testing, and for post-deployment interrogation. The charging circuit 34 assists the wireless charging of the battery 30 using the solar cell 32. The wireless charging occurs when the solar cell 32 is sufficiently exposed to continuous light from an external light source 26. For optical triggering of different MCU operating states, the solar cell 32 is exposed to an external light source 26 that generates predefined light pulse patterns. This results in corresponding voltage pulses from the solar cell 32. These voltage pulses are picked up by a comparator embedded within the MCU. As further described with respect to FIG. 8, different pulse patterns trigger the MCU into different functional states, such as states for temperature sensing, data reporting, etc. The measured temperature data during a testing cycle may be stored in the flash memory integrated in the MCU. This data may be encoded with a cyclic redundancy check (CRC) algorithm for transmission error detection. The data and the CRC verification bytes may be transmitted optically to the exterior receiver unit 28 using the LED indicators 40 controlled by digital output pins of the MCU.

As described below in connection with FIGS. 5-7B, the system can be integrated using a flexible polyimide PCB 90 and folded into a stack for encapsulation in the 8 mm package. The size of the ELM system stack may be 6.5× 6.3×4.5 mm³. The system may have a sleep mode current consumption of 5 µA at 25° C., and 12 µA at 125° C. The wireless charging time to charge the battery from 2.0 V to 3.0 V may be ≈10 hours with a 100 µA charging current. The storage time after system assembly and before the battery is depleted can exceed two weeks. Beyond that, the system battery may be configured to be recharged before the system will respond to any optical triggering. The operating frequency of the system clock may be 32.768 kHz. The program size in the MCU may be 2 KB.

The charging circuit block 34 may include a Seiko Instruments™ MS412FE rechargeable lithium battery 30 for energy storage, a Clare™ CPC1822 solar cell 32 for wireless optical charging, a rectifier diode 25 to prevent the reverse flow of the charging current, and a protection resistor $R_{protect}$ 27 to limit the charging current. Note that the resistor $R_p$ is used with the MCU comparator for optical triggering, and is not part of the charging circuit. A voltage is generated when the solar cell 32 is exposed to external light 26. This results in a current flowing from the solar cell 32, through the rectifier diode 25 and the protection resistor $R_{protect}$ 27, into the battery 30 for charging.

The battery 30 may use silicon oxide as its anode and lithium manganese composite oxide as its cathode. The Seiko Instruments™ MS412FE rechargeable lithium battery has a high capacity (1 mA·h) and a small form factor (14.8 mm×1.2 mm). The specified operating temperature for the battery is −20° C. to 60° C. High temperature tests of the battery have been performed. According to the testing results, the battery can support the system operation at 125° C. for at least two 6 hour cycles without evident capacity loss. No leakage or explosions were observed in any testing cycle.

The Clare™ CPC1822 solar cell is a monolithic string of photovoltaic solar cells. The nominal output voltage of CPC1822 is 4.2 V at an illuminance of 6000 lux. The nominal short-circuit output current is 50 µA, and this value can increase up to 200 µA with higher intensity light. This solar cell 32 has a footprint of 5.8×5 mm². The charging protection resistor $R_{protect}$ 27 may be selected as 10 kΩ to limit the charging current to 100 µA, following manufacturer guidelines for use of the battery 30.

A buffer capacitor 29 (e.g., 4.7 µF) is connected in parallel to the battery 30 to accommodate any transient current need when the system operates in the active mode. This includes brief use of the analog to digital converter (ADC), temperature sensor, high power oscillator for initialization of the MCU, etc.

Figure 4:
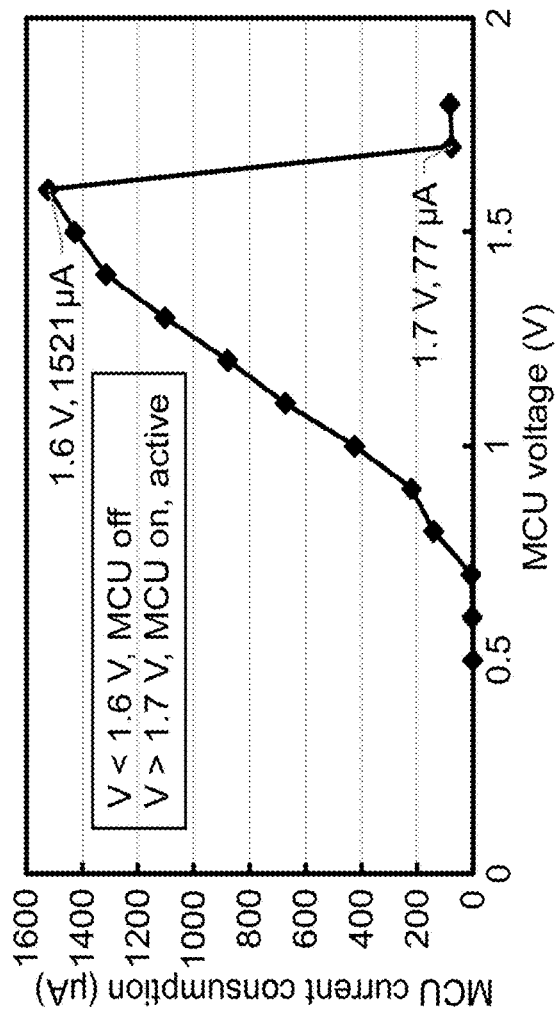
FIG. 4 is a graph showing measured current consumption of the processor used in the logging circuit of FIG. 3, as a function of its supply voltage.

The Schmitt trigger circuit 38 is used to prevent the MCU from awakening when the battery voltage is low. This circuit aids proper recharging of the battery 30. As shown in FIG. 4, the measured current consumption of the MCU increases rapidly with the MCU supply voltage (Vdd) when Vdd is between 0.7 V and 1.7 V. The maximum current consumption reaches 1521 µA when Vdd is 1.6 V. As Vdd increases to 1.7 V, the MCU is fully turned on and the current consumption drops to 77 µA, matching the specification in the MCU datasheet. The 1.7 V supply value is listed in the datasheet as the turn-on threshold voltage ($V_{th}$) of the MCU. The current consumption for Vdd<$V_{th}$ significantly exceeds the maximum allowed continuous discharge current of the battery 30 (100 µA). It is also much higher than the maximum current that can be produced by the solar cell 32 (≈200 µA). Therefore, recharging would be ineffective if the battery voltage is less than $V_{th}$ when no Schmitt trigger circuit 38 is used.

The Schmitt trigger circuit 38 may be designed to add hysteresis to the MCU power supply to prevent the MCU from draining any current while the battery 30 voltage is below $V_{th}$. The trigger circuit 38 may be placed between the power output of the charging circuit 34 and the MCU power input (Vdd) pin. It may be implemented with a nanowatt comparator 33 (such as a Texas Instruments TLV3012) and three resistors 35 ($R_{c1}$, $R_{c2}$, $R_{c3}$) to form a positive feedback loop. The TLV3012 comparator 33 has a low static power consumption (2.8 µA at 25° C.), small footprint (2.4×2 mm²), and fast response time (6 µs). This comparator 33 has a 1.2 V internal voltage reference. The three resistors 35, $R_{c1}$, $R_{c2}$, and $R_{c3}$, determine the hysteresis threshold voltage $V_H$ and $V_L$ ($V_H > V_L$). The output of the circuit $V_{out}$, which is connected to the MCU power input (Vdd), remains at 0 V during battery charging until the battery voltage reaches $V_H$, at which point the Schmitt trigger is turned on. When the battery 30 is discharging, $V_{out}$ goes to 0 V when the battery voltage drops to $V_L$. The $V_{out}$ is the same as Vcc when the Schmitt trigger is switched on. The values of $V_H$ and $V_L$ are given by the following equations:

$$V_H = \frac{1.2 \times (R_{C1} + R_{C2} \| R_{C3})}{R_{C2} \| R_{C3}} \quad (1)$$

$$V_L = \frac{1.2 \times R_{C3}}{R_{C1} \| R_{C2} + R_{C3}} \quad (2)$$

Exemplary resistance values may be $R_{c1}$=1 MΩ, $R_{c2}$=3.9 MΩ and $R_{c3}$=1.5 MΩ. The calculated $V_H$ may be 2.4 V and $V_L$ is 1.9 V. Since $V_L > 1.7$ V and $V_H > V_L$, this value set meets the requirement for protection. The resistors in the range of MΩ may be selected in order to keep the system current consumption low.

Thus, it will be appreciated that the trigger circuit 38 in useful in avoiding unnecessary power consumption during low battery conditions. As indicated above, this undesirable power consumption may occur because many energy sources such as battery 30 will provide electricity at different voltage levels depending on a state of charge of the battery, whereas many processors such as the MCU are rated for normal operation at voltages above a minimum operating voltage (e.g., above the turn-on threshold voltage $V_{th}$), yet they will draw more power at some voltages under that minimum operating voltage. The trigger circuit 38 inhibits power draw by the MCU at voltages under the minimum operating voltage, thereby avoiding the relatively large current draw that could otherwise occur at MCU supply voltages under $V_{th}$, which is 1.7 volts for the MCU used in the exemplary implementation, as indicated in FIG. 4.

The model no. C8051F990 MCU used for the ECU 36 includes the following features that make it suitable for at least some embodiments of the present invention. (1) Low power consumption: the power consumption of this MCU is 84 µA in the active mode, and 0.8 µA in the sleep mode at room temperature. (2) Small footprint: the footprint of this MCU is 3×3 mm², one of the smallest MCU's available with the functions necessary for a temperature logger. (3) Integrated temperature sensor: the MCU has an internal temperature sensor that can sense the environmental temperature with 10 bit resolution. This MCU has an 8 KB flash memory for programs and data storage. It will be appreciated by those skilled in the art that other ECU processors and circuits may be used as desired or necessary for other embodiments.

After a system is assembled and packaged, optical communication may be utilized to interact with the MCU. As mentioned earlier, the output of the solar cell 32 is fed into the high-impedance comparator input pin (MCU P1.0) of the MCU for this purpose. As will be further explained with respect to FIG. 8, the MCU stays in the sleep mode until it is awakened into the active mode and triggered into different operation states by voltage pulses from the solar cell 32. Temperature measurements are made using the internal temperature sensor. The measured temperature data are stored in the flash memory and are optically transmitted through two LED indicators 40 when requested by the exterior receiver unit 28. A protection resistor 37 of 50 kΩ may be used with each LED indicator 40 to moderate adequate current from the MCU digital output to the optical indicator for data transmission.

Two resistors may be utilized for the MCU comparator to work with the solar cell 32 for optical triggering: a parallel resistor $R_p$ 39 (e.g., 1 MΩ) connected across the positive and ground pins of the solar cell 32, and a series resistor $R_{sensing}$ 31 (e.g., 1 MΩ) connected between the solar cell positive pin and MCU pin P1.0. The $R_p$ resistor 39 is used to form a current flow path between the two pins of the solar cell 32, thus generating a voltage drop that can be picked up by the MCU comparator when the solar cell 32 is exposed to light. The $R_{sensing}$ resistor 31 is used to limit the current consumption into MCU P1.0. When the Schmitt trigger is off, the MCU is not powered on, and a modest resistance exists between the MCU P1.0 and ground instead of the high impedance when the MCU is on. Without the resistor $R_{sensing}$ 31, this path would draw most of the current generated by the solar cell 32 and disable the wireless charging capability when the Schmitt trigger is off. The use of the resistor $R_{sensing}$ 31 limits the current to less than 10 µA when the Schmitt trigger is off, and does not affect the operation of the MCU comparator pin when the trigger is on.

With reference again to FIGS. 5-7B, the ELM circuit 24 components can be integrated on a flexible polyimide PCB 90 and then folded into a stack for encapsulation into the 8 mm package. The PCB 90 includes top and bottom metal layers. The polyimide used for the PCB can be DuPont™ Pyralux AP, which has a maximum elongation of >50% after curing. All the electronic components except the battery 30 may be assembled on the top layer of the PCB 90. FIG. 6 shows a configuration of the system stack after the polyimide PCB is folded along the folding line 92. The stack has three layers: the solar cell 32 and LEDs 40 on the top layer, the battery 30 sandwiched in the middle layer, and the MCU and other components on the bottom layer. The thickness of the polyimide PCB 90 may be 300 µm in the component area and 200 µm in the fold. The thicker component area can stabilize the components and prevent the soldered pins from breaking during the folding process. The overall stack size may be 6.5×6.3×4.5 mm³ (L×W×H).

Figure 8:
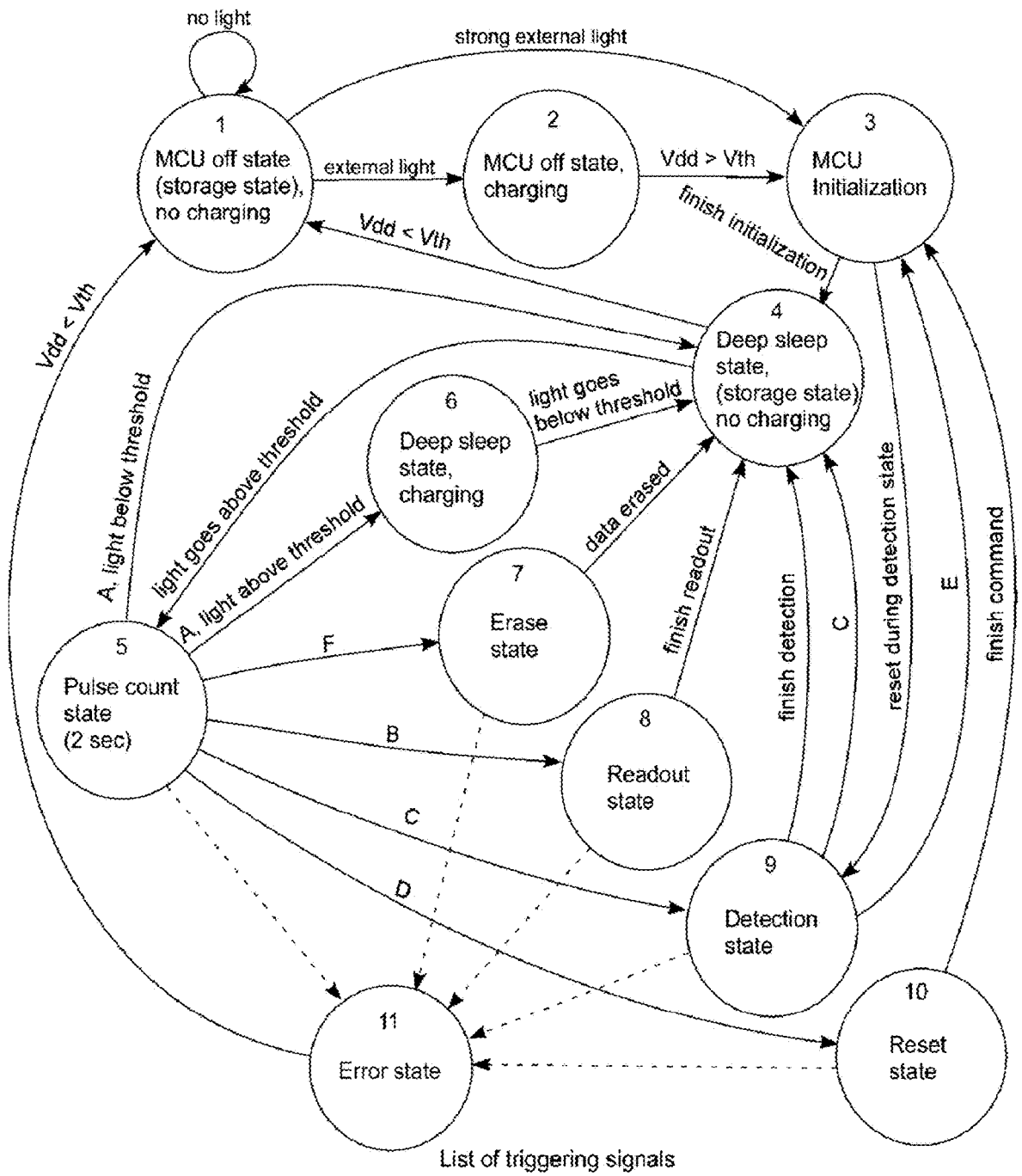
FIG. 8 is a diagram of a software program carried out by the logging circuit of FIG. 3, showing its operation as a state machine with the different operating states used to carry out the functions of the circuit.

The ELM 20, 50 system software may be designed for the MCU to provide functions including system control and power management, temperature measurement, temperature data processing and storage, and bidirectional communication with an exterior unit through the optical link. As mentioned above, the solar cell 32 in the system can generate different voltage pulses according to the light pulse patterns received from an exterior light source. These voltage pulses trigger the MCU into different functional states. As shown in FIG. 8, there are 10 functional states and one error state for the system. Two tasks of the system, temperature data collection and reporting, are implemented in the detection (State 9) and readout (State 8) states, respectively. Other states may be used for power management, wireless charging, system storage, and optical triggering, etc. The details of each state are provided below.

State 1, MCU Off State.

This is the state when the battery 30 is not being charged, and its voltage ($V_{cc}$) is below the threshold voltage of the Schimitt trigger ($V_{th}$, which represents either $V_H$ during charging or $V_L$ otherwise). The system may enter this state when the battery 30 has been drained below $V_{th}$ (e.g., Vdd<$V_{th}$), either during storage or after operations. The MCU remains off in this state. Any measured data will be retained in the MCU flash memory without loss.

State 2, MCU Off State (Charging).

This is a transitional state in which the battery 30 has a voltage below $V_{th}$ and is being charged. This state may be skipped if a strong external light is illuminating the solar cell 32 to provide enough charging current for the battery voltage to rise immediately above $V_{th}$.

State 3, MCU Initialization. This is a transient state during which the MCU turns on (e.g., in response to Vdd>$V_{th}$) and all global constants and variables are initialized or restored from the flash memory. Registers of pertinent MCU peripherals, e.g., ADC, comparator, digital I/O, etc., may be initialized for use in later operations.

State 4, Deep Sleep State (No Charging).

This is the state when the MCU is on but in the deep sleep mode to minimize power consumption. The system may enter this state from State 3 after finishing the initialization, or after finishing data collection or reporting operations. This is also the state in which the packaged system is stored before deployment and before the battery is depleted. The sensor's red LED may flash twice when this state is entered.

State 5, Pulse Count State.

This is a transitional state in which the system wakes up and operates in an input receiving state during which it processes the triggering light signals (see the table at the bottom of FIG. 8) received by the solar cell 32 and decides the state to enter next. The falling edges of the voltage signal generated by the solar cell are counted in a predetermined time frame (e.g., 2 sec). The number of falling edges (or voltage pulses) determines the state that the system enters according to the lookup table shown in FIG. 8. Continuous non-pulsatile incident light of sufficient intensity causes the system to enter State 6, in which the battery is charged while the system is in deep sleep mode. If there is continuous light impinging on the solar cell 32, but below a threshold needed or desired for charging, then the system enters State 4 (deep sleep, no charging). As indicated in FIG. 8, state 5 uses a pulse count safety range for each of the different pulse count state transition triggers to avoid accidentally entering the wrong state. Thus, for example, 0, 1, or 2 pulse counts within a 2 second window are all treated as a 0 pulse count that sends the system into state 4 or 6 depending upon the level of impinging light.

State 6, Deep Sleep State (Charging).

This state allows the system to be charged while the MCU is on and in the deep sleep mode. The red LED may flash twice when the system enters this state, and no LED may flashed when the system transitions back to State 4.

State 7, Erase State.

This state allows the user to erase the temperature measurement data stored in the flash memory to open up storage space for new measurements. The red LED may flash 6 times when this state is entered. The system returns to the deep sleep mode right after the erase is finished, and 2 additional flashes occur to indicate this, causing the LED to flash 8 times in total.

Figure 9:
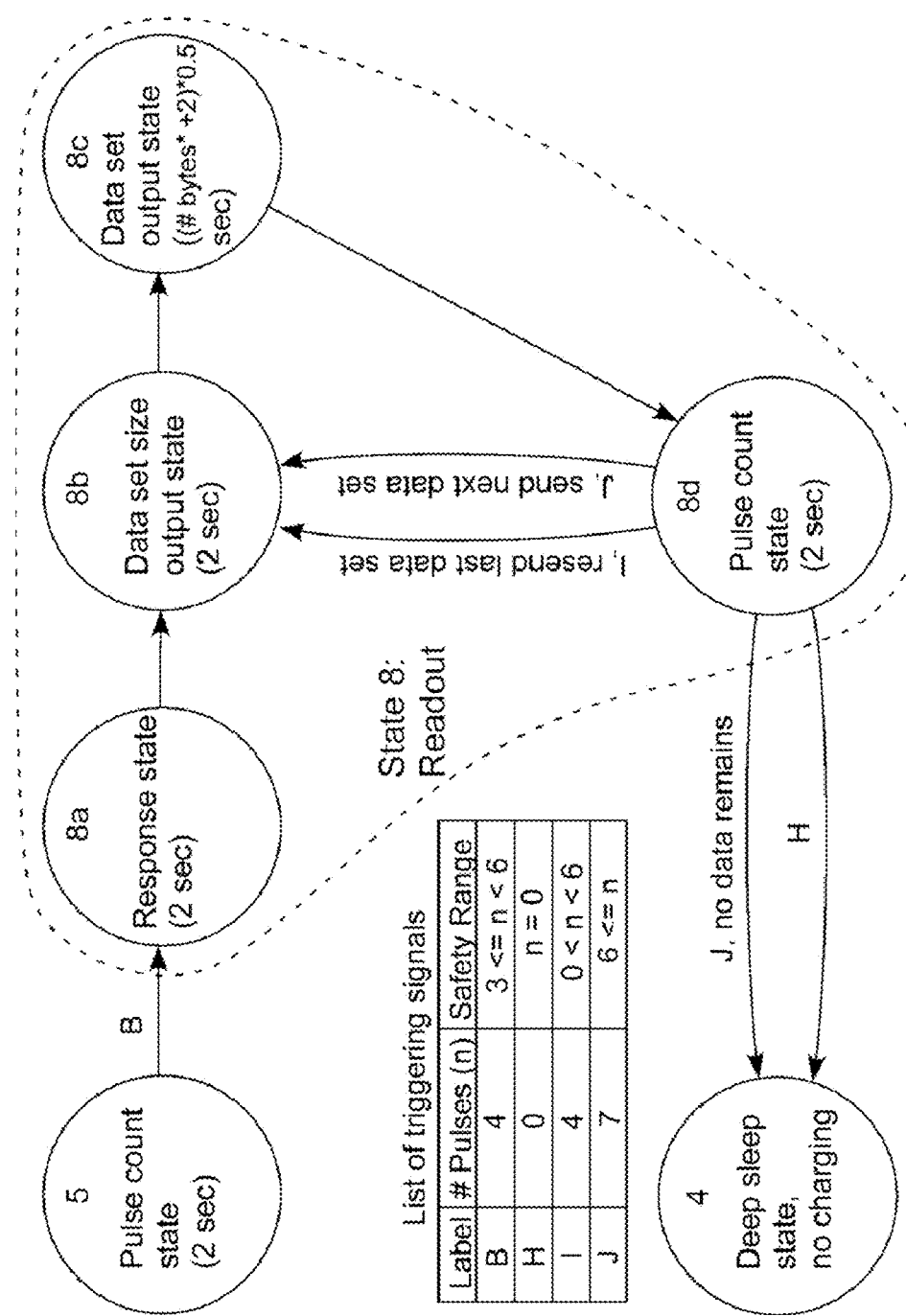
FIG. 9 is a diagram showing a set of sub-states of a readout state of the program of FIG. 8.

State 8, Readout State:

This state reports data to an exterior receiver unit by flashing the LEDs to represent measured temperature data. The diagram in FIG. 9 shows the sub-states in this state. When the system enters this state, it may flash the red LED 9 times. During data readout, the '1's may be represented by the on state of the LED, and the '0's represented by the off state. Data may be transmitted at a rate of 16 bits/sec. For each data set to be sent, the MCU may first send one byte of data to communicate to the exterior receiver the size of the data set (number of bytes). A '1' may be appended to the front of this byte of data, signifying the start of transmission. A delay of 2 seconds may be inserted from the time that this appended '1' is sent before the first bit of the actual data is sent. Each temperature data point is coded into two bytes; and all bytes of a data set may be sent consecutively. A '1' may be again appended to the front of the first byte of the data set to indicate the start of transmission. A built-in MCU resource may be used to perform CRC on all bytes of each data set, and the two-byte CRC result may be sent at the end of the data set transmission. The system then may wait 2 seconds for a response from the exterior receiver. According to the response received, it may resend the same data set, send the next data set, or exit the readout state. This state may also end if no response is received from the exterior receiver during the 2 second delay, or if all data have been sent properly.

Figure 10:
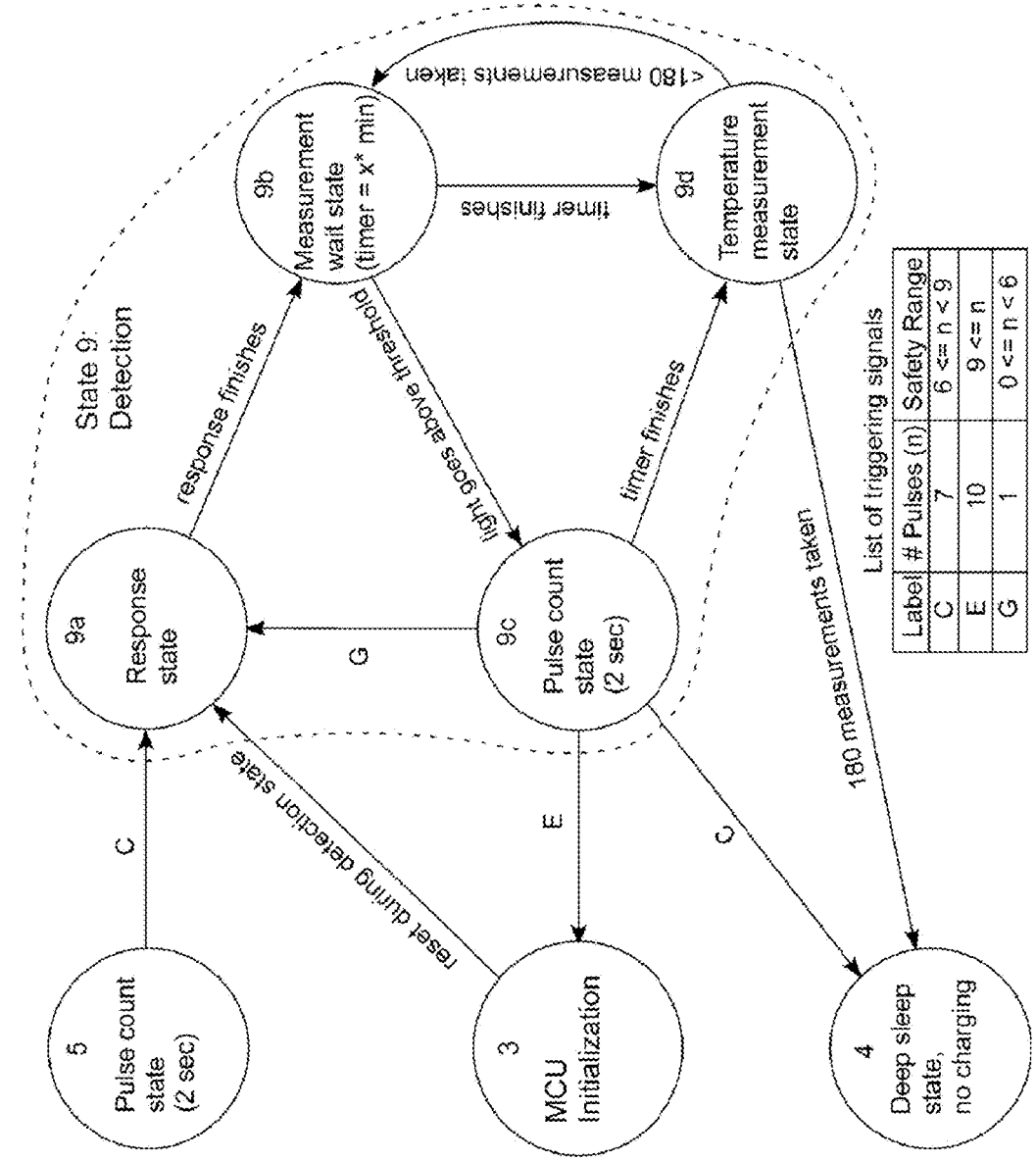
FIG. 10 is a diagram showing a set of sub-states of a detection state of the program of FIG. 8.

State 9, Detection State:

This state performs the temperature measurement with a predefined schedule. For the HPHT tests at Total, the measurement may be set to be taken every 2 minutes for up to 6 hours. This schedule can be reprogrammed by modifying the global constants in the software. The diagram in FIG. 10 shows exemplary sub-states in this state. When the system enters this state, the red LED may flash 3 times. The system then enters the sleep mode to conserve power until a measurement is to be taken. The first temperature measurement may be made 5 minutes after entering the state to allow the user time to load the system into the target environment. Then the system may wake up every 2 minutes for the following measurements. Between measurements, the MCU may also wake up by optical triggering (for testing or exception reasons). This can trigger the system to exit the detection state, to reset the MCU and immediately re-enter the detection state with the same sequence number of temperature measurement, or to check whether the system is in the detection state by LED flashing. If the time when the system is woken up by triggering (i.e., in State 9c) overlaps with the time that a measurement should be taken, the measurement may be taken immediately after State 9c finishes. In this state, the comparator of the MCU may be disabled when the system detects a temperature >60° C. As explained in more detail below, this is to avoid unexpected system wake up by interference signals on the comparator input at higher temperatures. The comparator is re-enabled when a temperature below 60° C. is detected. The comparator is also re-enabled when the system finishes all measurements and goes to the sleep mode (State 4).

State 10, Reset State:

This state allows the user to manually reset the system should any unexpected behavior occur, such as a clock source oscillating at an unexpected frequency. The red LED may flash 4 times when this state is entered. After reset, the system may nearly immediately enter State 4 and flash the red LED another 2 times, causing the red LED to flash 6 times in total.

State 11, Error State:

This is the "catch-all" state, which the system enters if the program should fail unexpectedly and stop execution. Once the system enters this state, it needs to wait for the battery voltage to drop below $V_{th}$ so that the system power is turned off. At that point, the system goes to State 1 and the battery can be recharged.

Exemplary Operation Flow of the System

Figure 11:
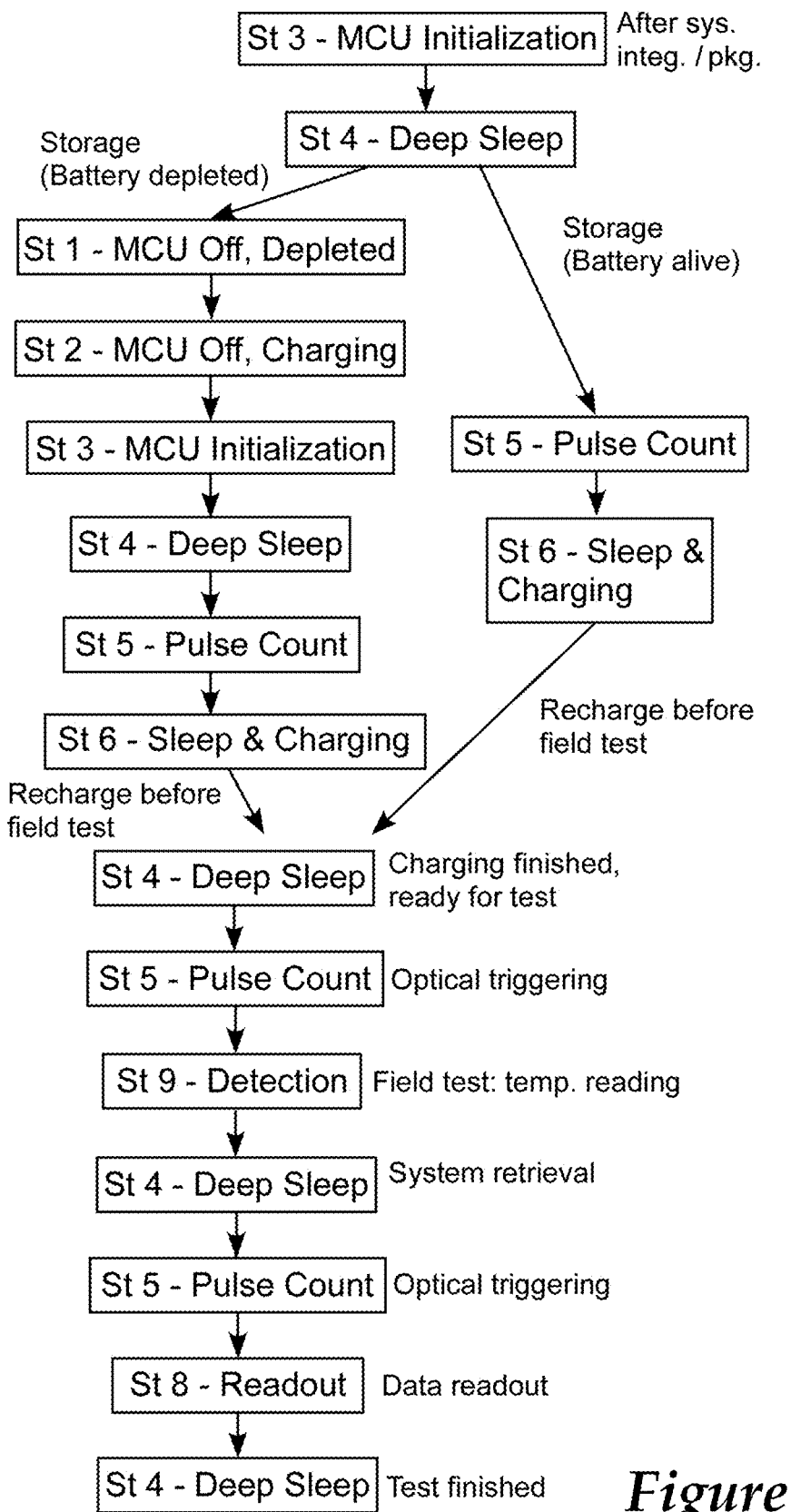
FIG. 11 is a flow chart of an exemplary field test for temperature logging using one of the illustrated ELMs.

An exemplary operation flow of a field test for temperature logging with the ELM 20 or 50 system is provided in FIG. 11. After assembly and packaging of the system with a fresh battery, the MCU is initialized (State 3) and then put to the deep sleep mode for storage (State 4). The system is expected to typically remain in State 4 until prepared for deployment. However, if the system is stored for too long (e.g., >2 weeks), the system battery may be drained below $V_{th}$, and the MCU will be turned off. In this case, the battery will be recharged to a voltage above $V_{th}$ (State 2) to allow the MCU to be re-initialized while the battery continues to be charged (State 6). If the MCU remains on until prepared for deployment, the battery should also be recharged to allow a longer operation lifetime (State 6). In either case, the pulse count state (State 5) is a transient state to identify optical inputs and has no effect on the charging. After the MCU finishes charging for a predefined period of time, it is returned to the deep sleep state (State 4) to await optical triggering. When the system is ready to be deployed, the detection state (State 9) is triggered by the user by providing the appropriate pattern of light pulse input. The system performs the series of temperature measurements following a predefined schedule. When all measurements are done, the system is returned to the deep sleep state (State 4). After the system is unloaded from testing and cleaned up, the user triggers the system into the readout state (State 8) using a different light pulse pattern and retrieves all measurement data in the system flash memory. This concludes the typical operation flow for temperature logging.

MCU Control Program Features

The MCU software may include a number of different features to enable low power operation at temperatures higher than the MCU specifications. These are discussed below.

Power Reduction.

In order to reduce system power consumption, the MCU may be placed in the sleep mode as much as possible. One such example is the waiting time between measurements in the detection state. As another example, when the MCU performs a task that takes a specific amount of time (e.g., when flashing the LEDs at a certain rate in the Readout state), the MCU may be placed in the idle mode to further conserve power. A peripheral of the MCU, such as a timer, may be used to generate an interrupt at the correct time and wake the system from the idle mode to continue the operation.

The clock oscillator for the system should remain on whenever the system operates. Its selection may be important to maintain low power consumption, and to keep the system operating current within the maximum continuous discharging current allowed by the battery. There are three oscillators that may be integrated with the MCU: two that operate at high frequencies (e.g., >20 MHz) for fast operation but require large currents that exceed the battery limitation in extended use, and one that operates at a lower frequency (e.g., 32 kHz) and consumes much less current. The low frequency oscillator, known as the real time clock (RTC) oscillator, is therefore selected for the system operation. The frequency is adequate for temperature logging in the target application.

RTC Oscillator Calibration.

The low power RTC oscillator may be the only clock source available when the MCU is in the sleep mode. The frequency of the RTC oscillator may be sensitive to temperature, increasing linearly with rising temperature but with inconsistent "jumps" in frequency depending upon the supply voltage of the MCU. Calibration of the oscillator may be necessary for the system to wake up and take temperature measurements at the correct time intervals. The RTC oscillator may be calibrated each time the MCU wakes up from the sleep mode by quickly comparing its frequency against a high precision internal oscillator. The frequency of this high precision oscillator is nearly independent of temperature, although it uses much more power and may be not suitable for the general clock.

RTC Oscillator Unintended Shutdown.

In the detection state, it was found that the RTC oscillator of the MCU has a chance of unintended shut-down upon wake-up from the sleep mode. This may happen either at elevated temperatures or when the comparator wakes the MCU too quickly from the sleep mode after entering it. By including codes to automatically re-initialize the RTC oscillator each time the MCU wakes from sleep mode, this problem can be alleviated.

Interference to MCU Comparator at High Temperature.

At high temperatures encountered in the detection state, the solar cell output voltage that is provided to the MCU comparator for optical triggering can have large variations that may inadvertently wake up the system from the sleep mode or even reset the system. Possible sources for this large signal variation may be the TI nanowatt comparator used for the Schmitt trigger and the solar cell. Since the MCU comparator is not required in high temperature operation, the comparator may be simply disabled when the temperature rises above 60° C., and re-enabled after the temperature returns.

Implementation of Major Software Functions.

This section reviews the MCU capabilities and programming techniques that may be utilized to implement several major software functions, including wake-up from the sleep mode, trigger handling for state selection, flash memory usage, and the CRC data encoding.

Sleep Mode Wake-Up.

With the MCU, options to wake up the system from the sleep mode may be port match or the comparator.

The port match technique involves giving a general purpose I/O (GPIO) pin of the MCU an expected value of 'high' or 'low.' In the case of this system, the pin used in port match would be connected to the positive terminal of the solar cell and given an expected value of 'low.' The system would wake from the sleep mode when a strong light shines on the solar cell, causing the GPIO input to change to 'high.'

Using the comparator for wake-up involves connecting the positive input of the comparator to the positive terminal of the solar cell and connecting the negative input to an internal precision voltage reference, which may have a voltage level of 1.65 V. The system can wake from the sleep mode when a strong light shines on the solar cell, and the analog voltage seen by the positive input of the comparator rises above the reference voltage.

Based on testing with an exterior receiver circuit, the comparator technique proved to be better than port match. The solar cell was not able to provide a strong enough signal to transition the monitored GPIO pin from low' to 'high' while using port match. The comparator, however, could easily be used to transition the system out of the sleep mode using external light. In addition, the 1.65 V voltage reference provides built-in noise rejection that makes the system less sensitive to ambient light, reducing battery power waste, and making the system more robust.

State Triggering.

When light with adequate intensity is incident on the solar cell, the MCU wakes up from the sleep mode. The light may be continuous for charging or in a pulse pattern for optical triggering. For the latter, the number of voltage pulses generated by the solar cell during a given timeframe (e.g., 2 sec) is counted by using the MCU comparator to detect the falling edges of the voltage pulses. For robustness, each functional state is assigned with a range of acceptable numbers of pulses as listed in FIGS. 8-10. When the count number falls in a certain range, the corresponding state is selected. An alternative approach is to use a patterned light with different combinations of 'on' and 'off' to represent '1' and '0', respectively. However, processing these more complicated patterns other than a simple series of light pulses may require more program memory.

Flash Memory Usage.

The non-volatile flash memory of the MCU may be used to store temperature measurement data, important variables, temperature sensor calibration constants, system status data for reset and restoring of the system status, etc. The chosen C8051F990 MCU divides the embedded 8 kB flash memory into pages of 512 bytes with addresses from 0x0000 to 0x1FFF. General example codes from Silicon Laboratories™ showing proper ways to read, write, and erase the flash memory were modified for the C8051F990 MCU and used as a library when programming the system software. A set of guidelines were followed when writing and erasing flash memory in order to reduce the risk of memory corruption. These guidelines include enabling the power supply voltage monitor, disabling system interrupts during writing or erasing procedures, clearing the 'flash write enable' and 'erase enable' bits after a writing or erasing operation, and reducing the places in code where the flash memory may be written and erased.

Calibration constants for the offset in the temperature sensor may be stored near the highest addresses of the flash memory. The top page of the flash memory (addresses 0x1E00 to 0x1FFF) is the lock byte page of the MCU, which may not be erased using software. To easily calibrate multiple MCUs, a program may be used to automatically write the offset data of the temperature sensor in the flash memory page right below the lock byte page (addresses 0x1A00 to 0x1DFF). These calibration data may be read from the flash memory during MCU initialization and stored as local constants to avoid unnecessary reading from the flash memory and reduce power consumption.

A page of the flash memory may be used to track the progress in the detection state during execution to allow the system to automatically re-enter the detection state at the same point should a system reset occur. These progress variables may be located below the program code on the flash memory page with addresses from 0x0600 to 0x07FF. The variables include those that track the total number of bytes of temperature measurement data stored in the flash memory (stored as a two byte number), the number of bytes recorded for the current detection state (stored as a two byte number), and whether or not the comparator should be enabled in the detection state at the time point (stored as a one byte number). All of these values may be updated each time the system wakes up from the sleep mode to take a temperature measurement in the detection state.

Storage of temperature measurement data, e.g., two bytes for each data point, may begin on the flash memory page immediately below the page for the detection state variables. The first temperature data byte may be stored at address 0x05FF, and all following data may be stored at consecutively lower addresses. When a temperature measurement is taken, the ADC may convert the temperature sensor output to a two-byte digital data, which forms a 16 bit union. The temperature offset constant may be then applied to this value, and the result compared to a threshold constant (e.g., 60° C.) to determine if the comparator should be disabled or enabled. The offset-compensated value may be then written to the flash memory with the high byte at the highest address available at or below 0x05FF and the low byte stored at the address immediately below the high byte. The variable keeping track of the total number of data bytes may be incremented twice, and the variable tracking the number of measurements for the current detection state may be incremented once. All detection state variables may be then updated in the flash memory by first erasing the page on which they are stored and writing the new values. There is room in the MCU to store a total of 767 temperature measurements.

The flash memory may be erased in whole-page segments by calling the erasing function. The input of the function may be any address that is part of the page to be erased. To erase temperature measurement data, the number (n) of pages to erase may be found by dividing the variable of the total number of data bytes by the page size, and then the erasing function is called n times to erase n pages, starting at the address 0x05FF and working toward lower addresses.

CRC Data Encoding.

The C8051F990 MCU has a built-in resource that is used to perform CRC on multiple bytes of data by updating a CRC input register one byte at a time. The algorithm used in this MCU is described in the MCU datasheet. To encode each data set (≤40 bytes) while it is being transmitted to the exterior receiver in the readout state, the CRC result register is first initialized to 0x00000000. The temperature data is transmitted starting with the high byte of the first measurement, followed by the corresponding low byte, and then the high byte of the next measurement, etc. Each data byte is read from the flash memory, copied to the CRC input register, and then transmitted using the LED. After all temperature measurement data in a data set are transmitted, the high byte of the CRC result register is read and transmitted, followed by its low byte. Having the CRC result transmitted immediately after the temperature data allows the exterior receiver to perform the CRC verification on the received set of data, and to request resend of the data set immediately if necessary.

Test Results

Stress tests at temperatures ≥150° C. were performed on a prototype of the ELM 20 to evaluate its capability to operate at these higher temperatures. In these tests, the flexible PCBs of ELM with assembled components were used without folding. Each PCB was mounted on a protoboard and tested in the setup shown in FIG. 16. During the tests, the temperature as detected by the thermocouple was increased and then held at the target value for 5 minutes before cooling down. Temperature uniformity around the PCB area was checked and the variation was <2° C.

Two types of tests were performed. In Type 1 tests, the system electronics were powered by a 2.7 V external power supply to verify whether the electronics work properly at the target temperatures, including 150° C. in Cycle 1 and 160° C. in Cycle 2. In Type 2 tests, the electronics were powered by a MS412FE battery, and the whole system was tested at 150° C. After the test, the PCBs were connected to the USB debugger interface, and the temperature data stored in the flash memory were retrieved.

Figure 12:
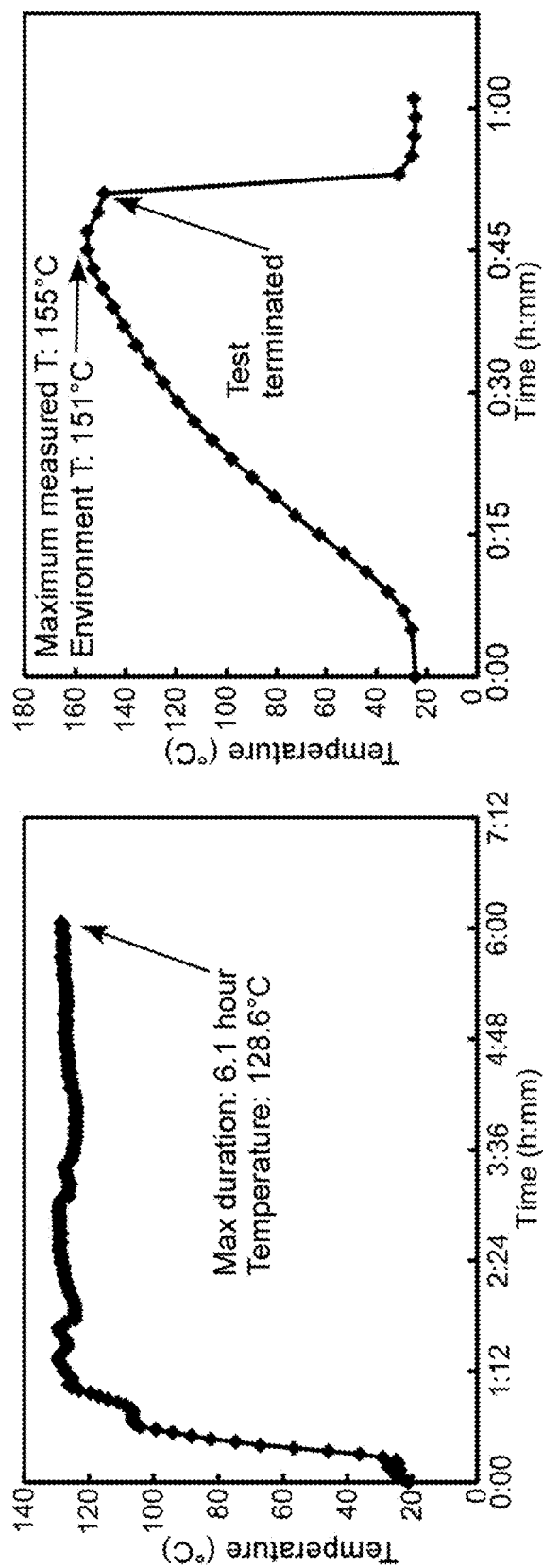
FIG. 12 depicts graphs of temperature data recorded by prototype ELMs during stress testing.

The system successfully passed all tests. In Type 1 tests, the maximum temperature measured by the thermocouple was 161° C. The electronics successfully detected and recorded temperature data at this temperature. In Type 2 tests, the whole system including the battery successfully operated at 150° C. FIG. 12 shows the temperature data recorded by the MCU in one of the Type 2 tests. There was an offset of ≈4° C. between the temperatures measured by the MCU and by the thermocouple, suggesting that additional sensor calibration may be utilized at this higher temperature. In summary, the ELM system including the battery can successfully operate at 150° C., and the system electronics remains functional at 160° C.

ELM 50

Figure 13:
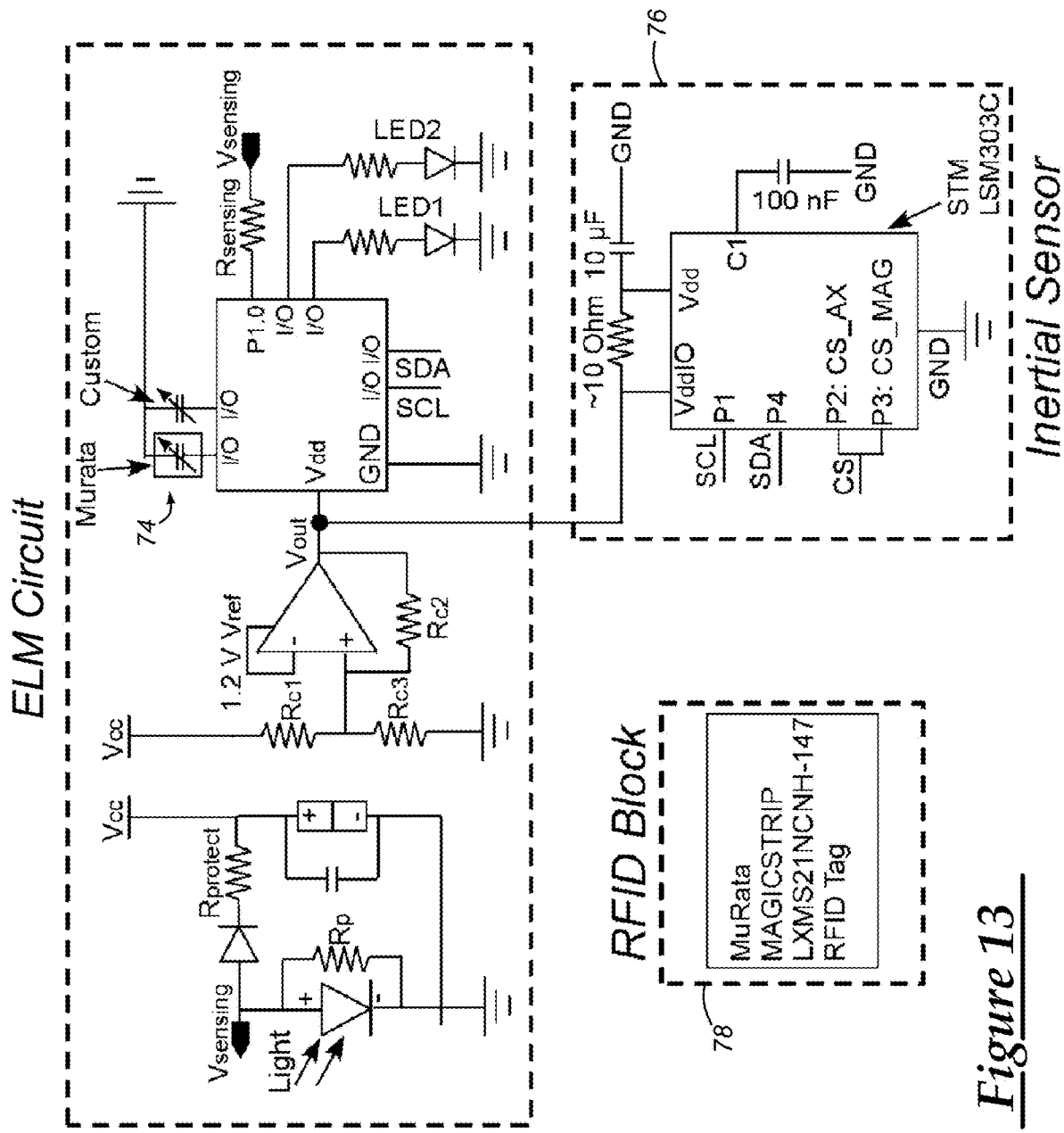
FIG. 13 is a schematic diagram of an electronic logging circuit used in the ELM of FIG. 2.

As discussed above, FIG. 2 depicts an embodiment (ELM 50) which includes additional sensors 74, 76 and an RFID tag 78. FIG. 13 shows a schematic for ELM 50 that includes the ELM circuit 24 of ELM 20 with additional pressure sensors 74 connected, as well as an inertial measurement unit (IMU) 76. The pressure sensors 74 may be implemented with a Murata™ SCB10H-B250 as well as one or more other pressure sensors that can be selected for different ranges or sensitivities. The IMU may be a STMicroelectronics™ 6-axis IMU LSM303C IMU. The RFID may be a Murata™ MAGIC STRAP™ RFID Tag.

Figure 14:
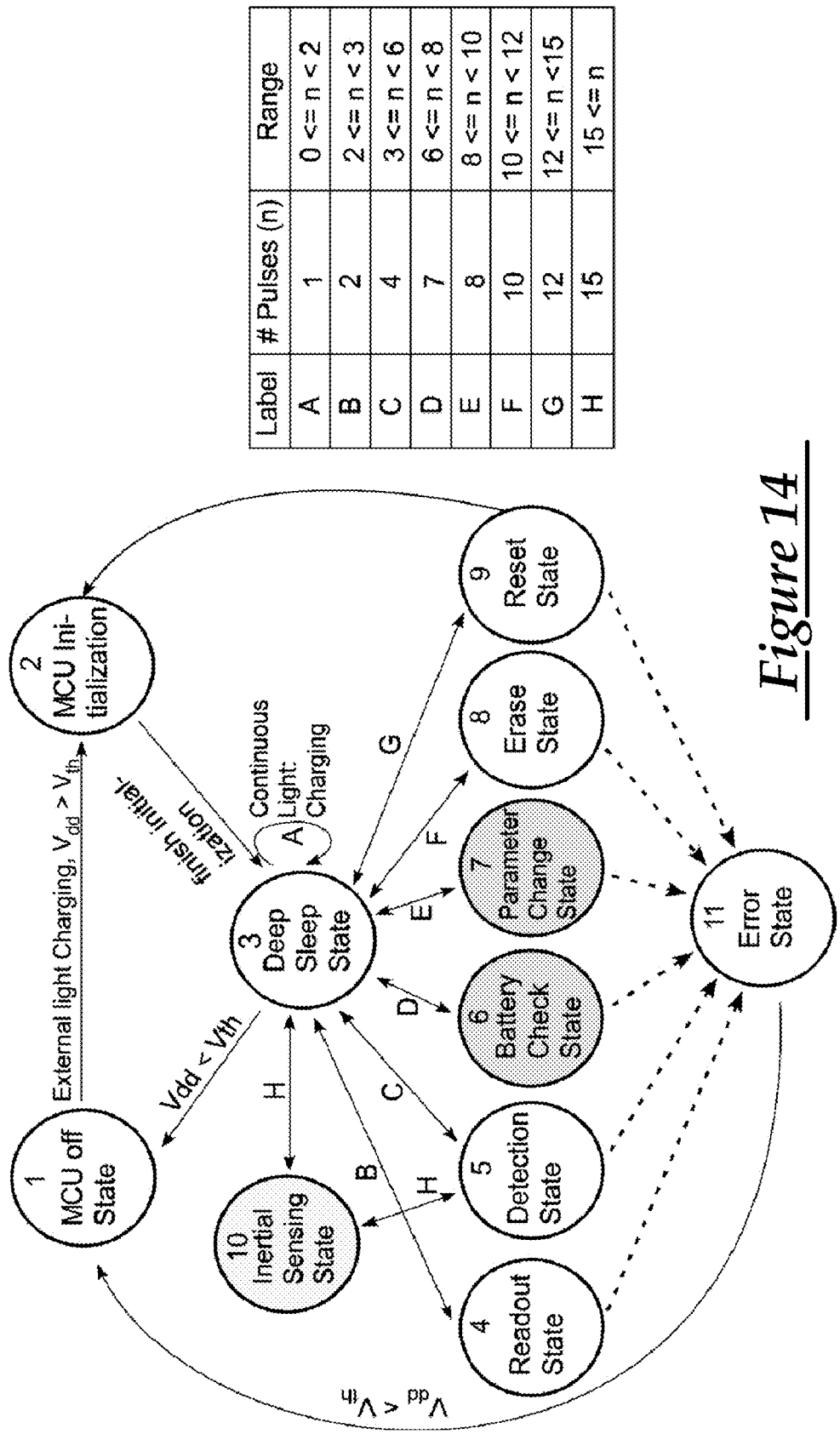
FIG. 14 is a state diagram of the operational states carried out by the software program of the ELM of FIG. 2.

FIG. 14 depicts a state diagram for ELM 50 that includes three additional states than that shown in FIG. 8 for ELM 20—a battery check state, a parameter change state, and an inertial sensing state. The battery check state permits monitoring of battery voltage, which may be advantageously done immediately prior to system deployment to ensure sufficient initial battery charge. The parameter change state permits adjustment of the detection timing, sensor selection, and other configurable settings for the system circuit operation. This may also be done prior to deployment. FIG. 14 also provides a table of the pulse commands that may be used by the external light source to trigger or command ELM 50 into the different states. The details of these additional three states are provided below.

State 6, Battery Check State.

In this state, the battery voltage is measured and the voltage information is transmitted through the optical link to the external interface. This allows the user to evaluate the system battery condition, or to estimate the amount of time needed to fully charge the battery. After being triggered into this state, the system may flash a red LED 5 times to indicate that it has successfully entered the state. The analog-to-digital converter (ADC) in the MCU then reads the battery voltage and converts it to digital data. This data may be optically transmitted to the external interface. The system returns to deep sleep state afterwards.

State 7, Parameter Change State.

This state allows the user to modify system operation parameters such as the measurement interval. It also allows the user to select which pressure sensor is to be activated in the detection state, or to select both pressure sensors. The measurement interval determines how frequently the system wakes up and takes measurements. Increasing the measurement interval would save system power, but reduce the time resolution of the measurement. The new parameters may be entered into the Labview™ software interface by the user. The system is then triggered into this state and the new parameters are transmitted to the system. The system may flash a red LED 4 times to indicate that it has successfully entered this state. The system returns to the deep sleep state after the transmission of parameters is completed.

State 10, Inertial Sensing State.

This state may be being implemented to support the inertial sensing function. In this state, the MCU responds to triggering signals from the IMU when motion has been detected and inertial data have been recorded. It also receives and stores the measured data in the flash memory. The red LED may be flashed 8 times when this state is entered successfully.

Figure 15:
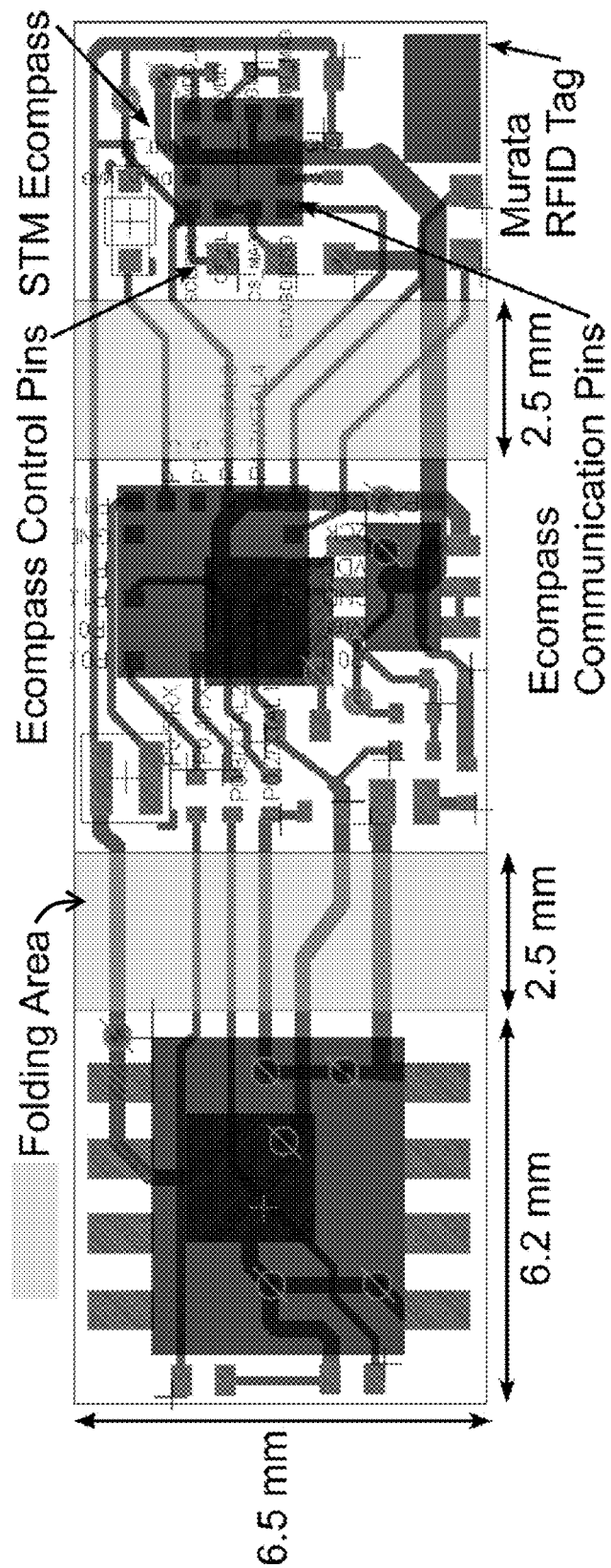
FIGS. 15 and 16 show an exemplary printed circuit board layout for the logging circuit of FIG. 13 along with tri-fold stacking of the components for packaging of the logging circuit into a housing.
Figure 16:
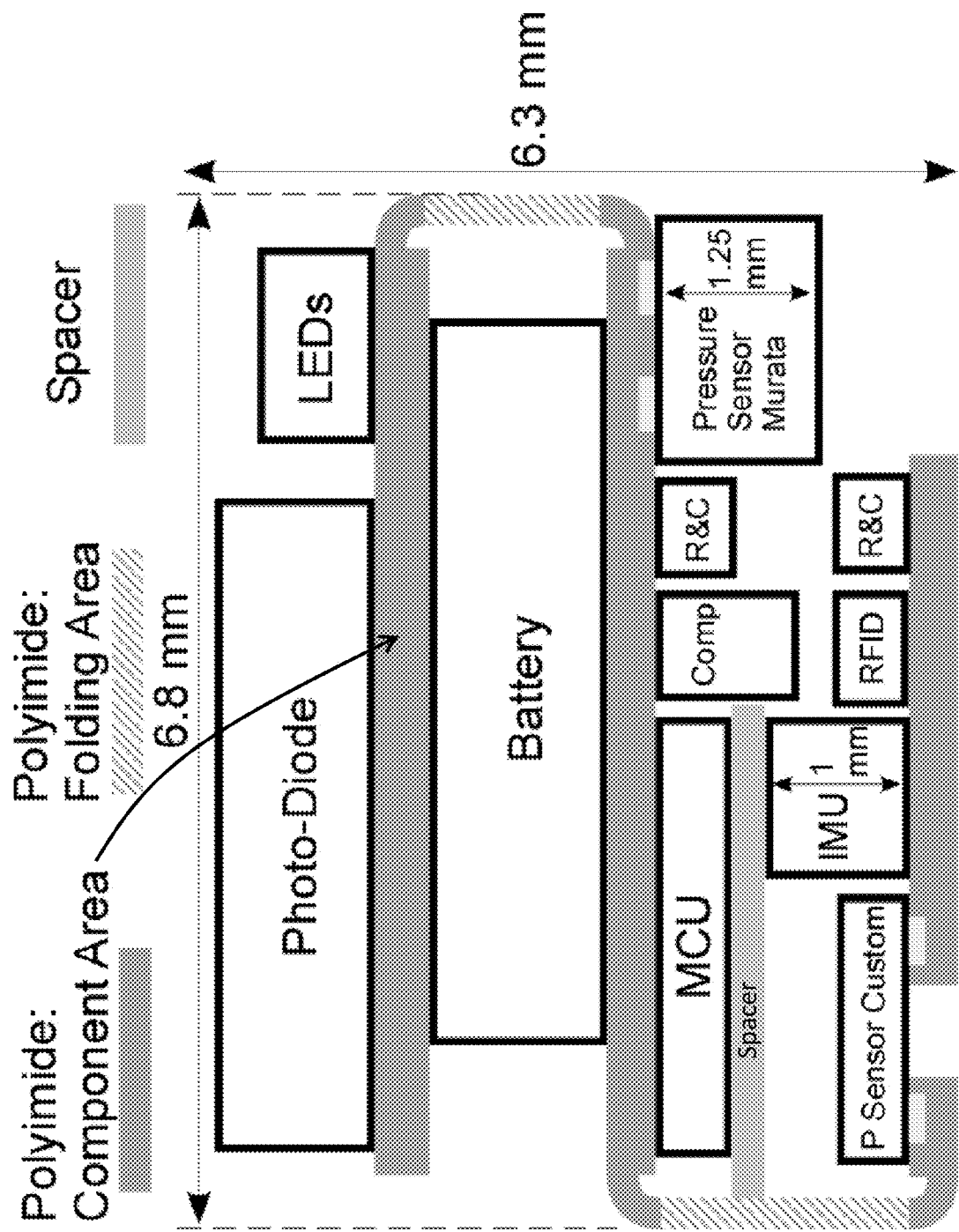

FIGS. 15 and 16 show an exemplary PCB layout and tri-fold stacking of the components for packaging into a specified (e.g., 6.5×6.8×6.3 mm) housing space. As shown in FIG. 16, the pressure sensors may be mounted on the PCB in a manner so that the sensitive surface of the sensor is oriented away from the PCB or toward the PCB. In the latter case, an opening in the PCB may be created below the sensitive surface to permit accurate transmission of pressure to the surface. For ELM 50, the housing shown diagrammatically in FIG. 2 may be implemented in any manner suitable to provide appropriate environmental protection of the contents of the housing, while permitting optical communication into and out of the housing, and while enabling the embedded pressure sensor to detect the external pressures on the housing.

Figure 18:
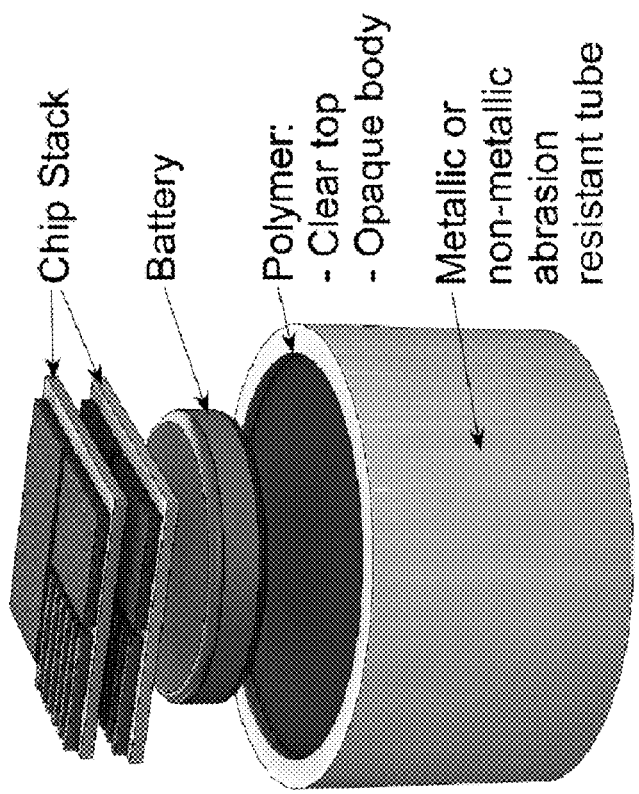
FIGS. 17 and 18 illustrate different embodiments of packaging designs for the illustrated ELMs that utilize a tubular shell to house the circuit components.
Figure 17:
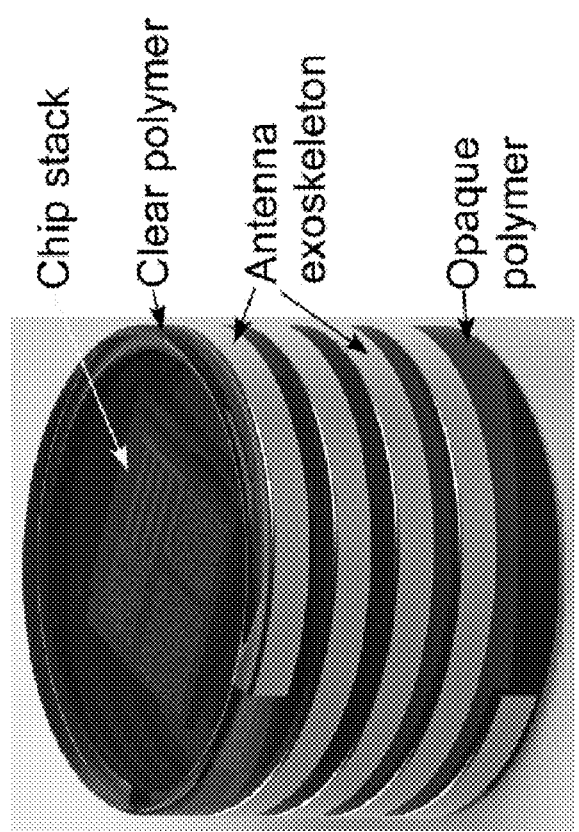

Referring now to FIGS. 17 and 18, there are shown two embodiments of such a housing design. The packaging of FIG. 17 includes a rigid tubular housing or shell, and antenna exoskeleton helically wrapped about the shell. The shell may be made from a material that is resistant to abrasion and impact. This may be filled with a transparent soft polymeric material within which the electronics and sensors are located. The soft nature of the polymer protects the electronics from impact while permitting the ambient pressure to be transferred to the pressure sensor in an accurate manner. The transparent nature of the epoxy permits optical communication and charging of the battery through solar cells. The filling may also include a layer of harder epoxy, as needed; this layer may be opaque to shield the electronics. The tubular rigid exoskeleton may be comprised of, or enhanced by, an antenna coil, as shown. The metal coil can be commercially acquired or a custom manufacture.

For systems that do not need the additional antenna, a package design such as shown in FIG. 18 could be used. This includes a metallic or non-metallic tube without the antenna coil. A non-metallic tube may be used for systems that use radio frequency (RF) communications, while a metallic tube may be used for systems that use optical communications.

With reference now to FIGS. 19A-19D, for the packaging of ELM systems, stainless steel or alumina ceramic may be used as the tube material for the shell of the housing. For stainless steel, the shell may be made by cutting off-the-shelf stainless steel tubes by wire EDM. For ceramic shells, custom fabrication of alumina tubes may be used.

Figure 19A:
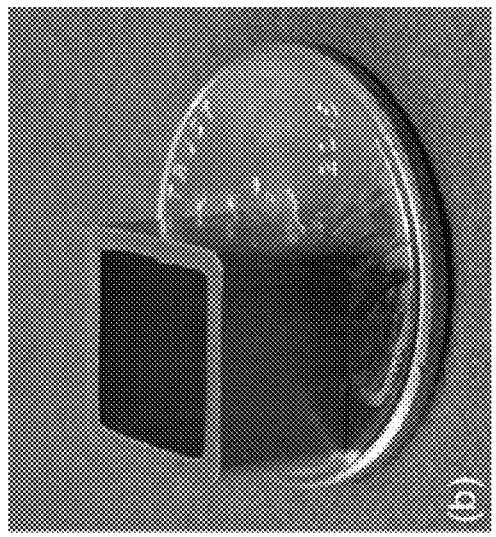
FIGS. 19A-19D show different tubular shells that may be used for housings of the illustrated ELMs.
Figure 19B:
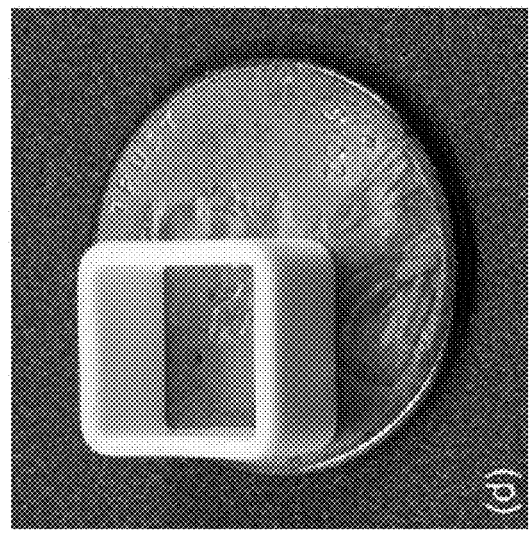
Figure 19C:
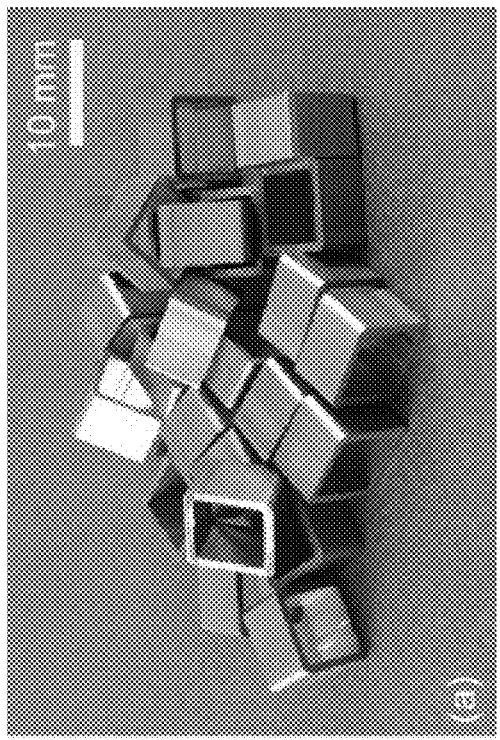
Figure 19D:
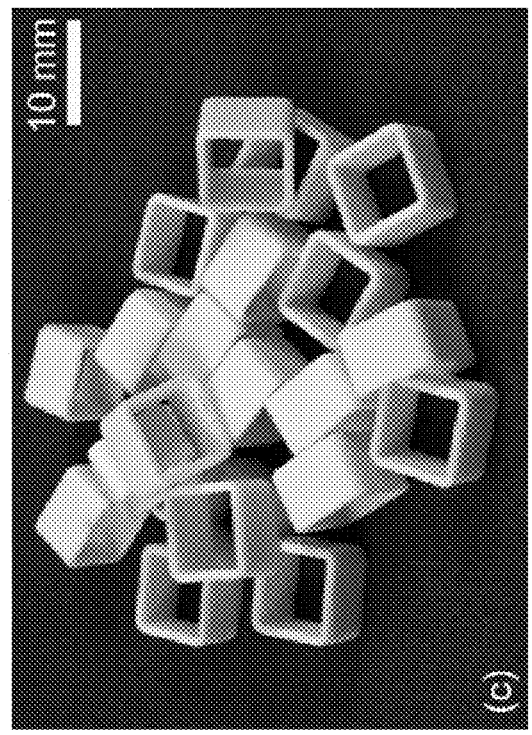

Based on the size of the ELM system stack (e.g., 7.2× 6.6×5.5 mm$^3$), stainless steel 304 (SS304) tubing with a square cross section and a closely matched standard size may be used. The tubing has an inner size of 7.8×7.8 mm$^2$ and outer size of 9.5×9.5 mm$^2$. Prototypes have been made by cutting the stainless steel tubing into 6.5 mm lengths by wire EDM. The length tolerance was ±0.1 mm. FIGS. 19A and 19B depict the shells made by this cutting process. Customized alumina tubes for the ELM systems were also designed and fabricated and are shown in FIGS. 19C and 19D.

Figure 20:
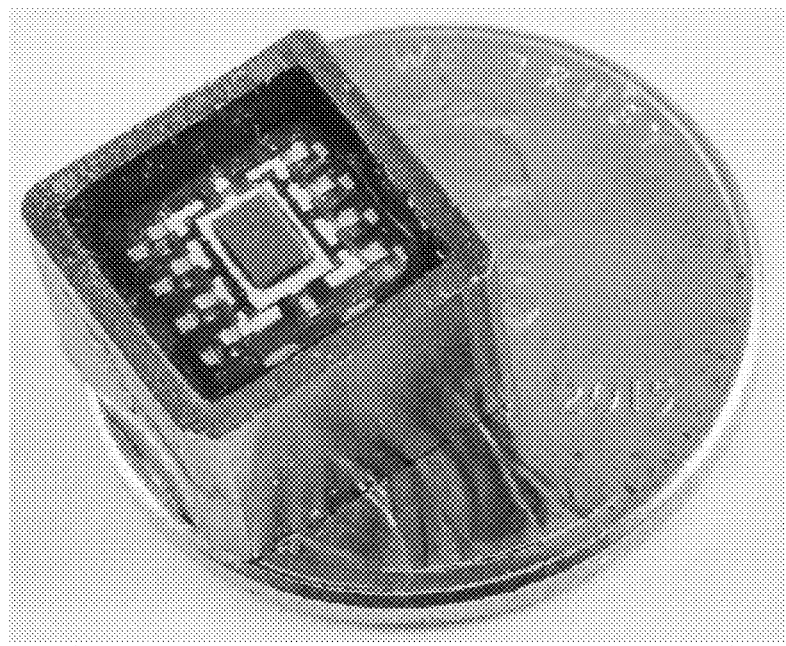
FIG. 20 is an image of an actual prototype showing a manufactured logging circuit such as in FIG. 13 or 21 using the printed circuit board layout of FIGS. 15-16 in a tubular housing such as shown in FIG. 19B.
Figure 21:
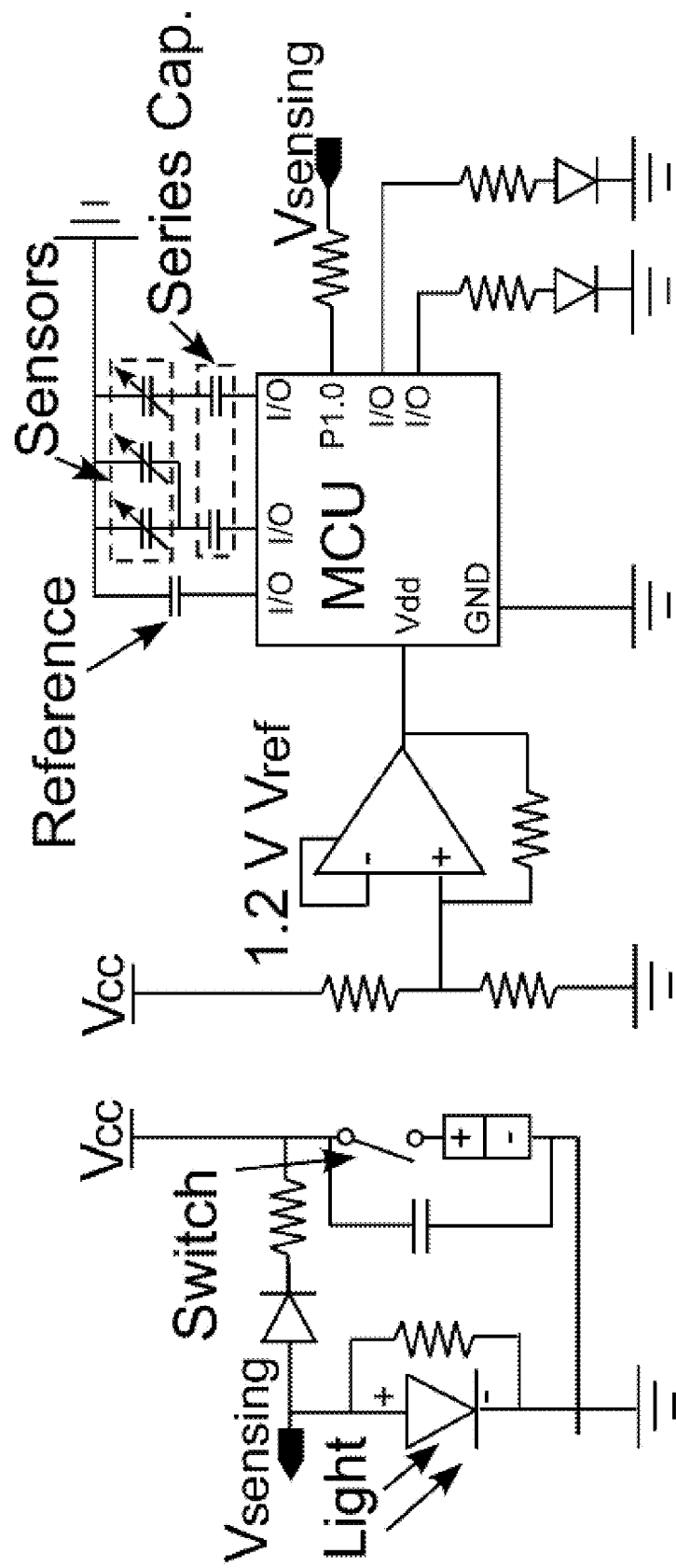
FIG. 21 is a schematic diagram of an electronic logging circuit used in a third embodiment of an ELM constructed in accordance with the present invention.

For ELM 20 and ELM 50 that utilize optical communication for receipt of power and commands by solar cell 32 and for transmission of data by LEDs 40, a translucent polymer (polymeric material) may be used. For example, FIG. 20 depicts a completed ELM using a tubular stainless steel shell and clear silicone caulk. The caulk is used to seal into the shell an electronic logging circuit such as shown in FIG. 3, 13, or 21 with a stacked printed circuit board layout such as shown in FIG. 5-6 or 15-16. Optical charging, commanding, and readout is carried out through the clear silicone caulk. However, as noted above, some embodiments may require optical shielding for one part of the system, such as bare electronic chips, and optical transparency for the other parts, such as the receiver and/or transmitter. Two polymeric materials may be used in such case: one opaque and one translucent. Additionally, where a pressure sensor is used, a polymeric material having a low spring constant on the order of $10^4$ N/m or less may be used to seal the sensor in the tubular shell, with the polymeric material placed over the diaphragm of the pressure sensor. This flexibility of the polymeric material may then be at least 10× lower in stiffness than the spring constant of the pressure sensor diaphragm. This helps reduce the temperature coefficients of the polymer-encased pressure sensor and mitigates the impact of unit-to-unit variations in the thickness of the polymer. Also, polymeric materials compatible with high temperatures of at least 125° C. may be used, and preferably are able to cure at low temperatures to avoid degradation of the embedded battery 30. Chemical resistance to API brine and hydrocarbons is not a major constraint, as the packages may be covered with a polymer coating that is resistant to these chemicals.

Depending on the application of the ELM, the Do It Best™ clear silicone caulk (Product no. 18339 available from Do It Best Corp.) and Dow Corning™ Sylgard 184 (referred to as PDMS) may be used as the translucent polymer. For applications using an opaque polymer for some or all of the shell filling, DOW Corning 736 heat resistant silicone caulk may be used. Any other suitable polymeric material may be used as well and will depend upon the particular environmental application with which the ELM is used.

Both the caulk and the PDMS belong to the silicone category of polymeric materials. Both are soft, clear, and serviceable over 200° C. Both can be cured at room temperature. Their properties are listed in Table 1. The chemical composition of the caulk is mainly hydroxyl-terminated dimethyl siloxane, and of the PDMS is dimethylvinylsiloxy-terminated dimethyl siloxane. The different end functional groups result in differences in the properties of the polymers. The caulk has good resistance to brine and moisture, and has good adhesion to many materials. The PDMS does not chemically degrade in brine; however, it readily absorbs moisture. It also has very low viscosity before curing, which is desirable for filling voids in the system stack. Additionally, cured PDMS has excellent transparency, which is desirable for optical communication, compared to the caulk.

TABLE 1

| Product | Do It Best ™ Silicone Sealant ("caulk") | Dow Corning ™ Sylgard 184 ("PDMS") |
|---|---|---|
| Main composition | Dimethyl siloxane, hydroxyl-terminated | Dimethyl siloxane, dimethylvinylsiloxy-terminated |
| Spring constant | ≈2 × $10^4$ N/m | ≈2 × $10^4$ N/m |
| Color | Translucent | Transparent |
| Service temp. | −50° C.-230° C. | −45° C.-200° C. |
| Curing temp. | 25° C. | 25° C.-150° C. |
| Viscosity before curing | ≈50 (toothpaste-like) | ≈3.5 (honey-like) |
| Compatibility with brine | Compatible | Compatible |

FIG. 21 depicts a third embodiment of an electronic logging circuit that may be constructed the same or similar to that of the logging circuits of ELM 20 and ELM 50. Thus, the various aspects of the construction and operation of ELM 20 and ELM 50 discussed above may be utilized for the third embodiment of the electronic logging circuit as well, except where specific differences or variations are described below. One such difference is that the third embodiment of the electronic logging circuit includes a switch in the charging circuit that permits the ELM system to be fully shut down to preserve the battery life during storage of the system before deployment and/or after retrieval. The switch may be a mechanical switch such as a slide switch that uses a sliding knob for activation. Alternatively, it can be a switch that is activated by RF, magnetic, acoustic, optical, or thermal means. Suitable mechanical, electrical, thermal, and magnetic switches and circuits for operating them will be known to those skilled in the art.

Another difference is that the third embodiment of the electronic logging circuit uses reference and series capacitors for improved operation. The reference capacitor is included to allow data compensation for the temperature effect of the capacitance-to-digital (CDC) converter in the MCU. This permits the third embodiment of the electronic logging circuit to determine how the circuit characteristics drift with temperature, enabling the processor to compensate for these drifts. For example, leakage current in the pressure sensors and/or other components may change with temperature, and the reference capacitor permits the processor to properly compensate for these changes using suitable calculations that will be known or apparent to those skilled in the art. Those calculations can be incorporated into the ELM software. The reference capacitor used may be selected to have a low temperature coefficient and low pressure response, and may be, for example, a ceramic capacitor having a similar capacitance (e.g., a few picofarads) that is the same as or similar to that of the pressure sensor(s) used.

The third embodiment of the electronic logging circuit also includes a series capacitor between each of the ECU inputs and the corresponding sensor to protect the ECU from an inadvertent short circuit to ground if the sensor fails. These series capacitors may have a capacitance value much larger than the capacitance of the pressure sensor.

The non-volatile flash memory of the MCU is used to store temperature and pressure measurement data, system variables, temperature sensor calibration constants, system status data for system reset, etc. In order to reduce the risk of memory corruption, a set of guidelines may be utilized when writing and erasing the flash memory. These guidelines include enabling the power supply voltage monitor, disabling system interrupts during writing or erasing, clearing the 'flash write enable' and 'erase enable' bits after a writing or erasing operation, and reducing the places in the program code where the flash memory may be written and erased. Example codes from Silicon Laboratories for reading, writing, and erasing the flash memory of the C8051F990 MCU may be used as standard functions when programming the system software. Also, these software codes may be modified as appropriate for a particular implementation.

Other improvements may also be made in flash memory-related operations to reduce power consumption. The 8 kB flash memory embedded in the C8051F990 MCU is divided into pages of 512 bytes with addresses from 0x0000 to 0x1FFF. The operations of the flash memory, i.e., reading, writing or erasing, may be always carried out on a whole page basis, even if only a single byte of data is needed. In other embodiments, 2-byte measurement data was written to the flash memory after each measurement. In the third embodiment of the electronic logging circuit, to reduce the number of flash memory operations and save power, the data is temporarily stored in the RAM after each measurement. A variable tracking the total number of bytes of measured data is stored in the flash memory with other system status data. This variable is updated each time the system exits the detection state. The data in the RAM is written to the flash memory every time when the variable reaches the multiple of a predetermined value. The battery voltage may also be checked after each measurement. The data in the RAM may also be written to the flash memory when the battery voltage is lower than a threshold value.

The constants for calibration of the temperature sensor are stored in a flash memory page. In other embodiments, these constants may be read form the flash every time a measurement is taken. To eliminate unnecessary reading operations from the flash memory and reduce power consumption, the calibration data of the third embodiment of the electronic logging circuit are now read from the flash memory once during MCU initialization and stored as local constants in the RAM.

The C8051F990 MCU has 8 kB Flash memory space for both the assembly code of the program and the measurement data. With the aforementioned new features, the program size may increase. This reduces the memory space available for data storage, despite more types of measurement data to be stored. To address this issue, the data storage format may be rearranged so that the memory space can be used more efficiently. In other embodiments where memory space is more abundant, each temperature measurement may have a 10-bit resolution, and 2 bytes (16 bits) of memory space may be used for that. Six bits of the space is thus wasted for each measurement point. In the third embodiment of the electronic logging circuit, when there is one pressure sensor activated, 10-bit temperature data is combined with 14-bit pressure data to form 3 byte of data, instead of the 4 bytes that would be necessary to store temperature and pressure data separately, saving 1 byte for each measurement or allowing 33% more measurements to be stored. When both pressure sensors (or the reference and one pressure sensor) are selected, the 10-bit temperature data is followed by two 11-bit (low resolution, or LR mode) or two 14-bit (high resolution, or HR mode) segments of pressure data. In this case, each measurement occupies 4 bytes (LR mode) or 5 bytes (HR mode) of flash memory instead of 6 bytes, saving up to 2 bytes for each measurement or allowing up to 50% more measurements to be stored. Table 2 shows the calculations of the number of measurements (data sets) that can be stored in the MCU memory using the new scheme. Assuming that the measurement is taken every 2 min. and 3.5 kB out of the total 8 kB is available for data storage, up to 40 hours of data can be stored for measurement of both temperature and pressure.

TABLE 2

|  | One P data or one T data | One P data and one T data | Two P data (LR) and one T data | Two P data (HR) and one T data | Three P data (HR) and one T data |
| --- | --- | --- | --- | --- | --- |
| Pressure | 14 bits | 14 bits | 2x 11 bits | 2x 14 bits | 3x 14 bits |
| Temperature | 10 bits | 10 bits | 10 bits | 10 bits | 10 bits |
| Total bytes | 2 | 3 | 4 | 5 | 7 |
| Total data sets | 1792 | 1194 | 896 | 716 | 512 |
| Max time* | >59 h | 39 h 48 min | 29 h 52 min | 23 h 52 min | 17 h 4 min |

Figure 22:
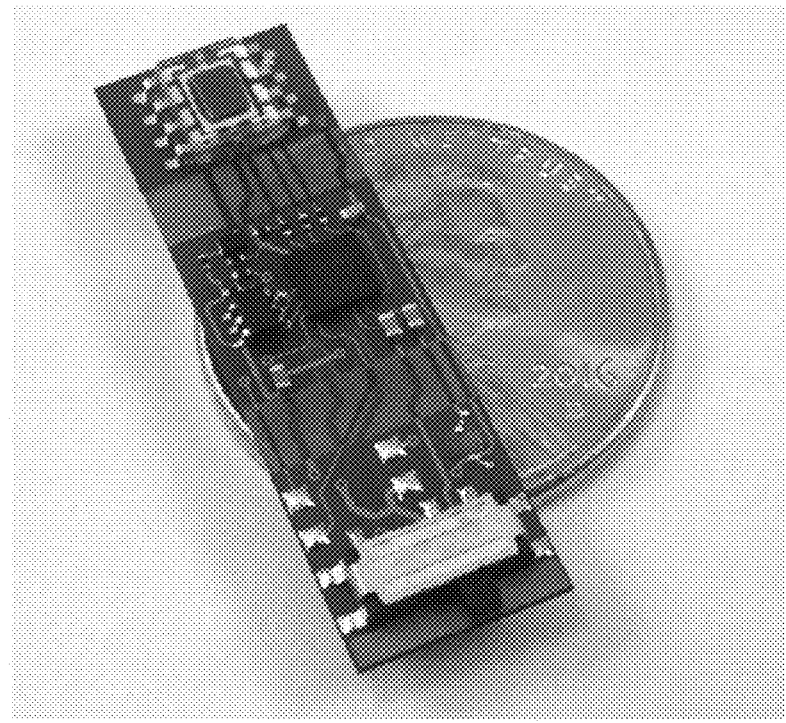
FIG. 22 is an image of an actual prototype showing the manufactured logging circuit of FIG. 21 as it would be utilized in a flat (unfolded) condition.

Referring finally to FIG. 22, there is shown another packaging embodiment in which the ELM is maintained in a flat (unfolded) condition for uses in applications either requiring or benefiting from a low profile ELM. A printed circuit board layout that is the same as or similar to that shown in FIGS. 5-6 or FIGS. 15-16 can be used. The flat ELM of this embodiment may be encapsulated in a protective polymer or otherwise attached to or incorporated into a rigid or flexible carrier.

Advantageous Features

Those skilled in the art will appreciate the following unique features of the ELM designs described above.

The ELM system functional states for charging, sleep, wake-up, optical communication, detection, data readout, etc., and the transitions between the states with optical triggering. (see FIG. 8)

The approach used to serially transmit data with or without CRC error check through an optical link with an external readout unit. (see FIG. 9)

The approach used to wake up the system at a preset time period to perform a series of measurements of temperature (and other environmental parameters), while allowing optical triggering to interact with the system during the waiting time between the measurements. (see FIG. 10)

The operation flow of the ELM system during a field measurement. (see FIG. 11)

The techniques used to maximize reduction in system power consumption:
  The MCU enters the deep sleep mode during all waiting time periods during which no active task is to be performed, and using the low power options for system resources (e.g., the lower power oscillator).
  The MCU enters the idle mode during active tasks of extended duration (e.g., flashing LEDs at a certain rate for data readout). It is then triggered back into the active mode by an interrupt from an MCU peripheral such as a timer to continue the operation.

The techniques used to allow the system components to operate properly at high temperature:
  The internal oscillator that is used for its low power consumption can have high sensitivity to temperature and supply voltage. Each time the MCU wakes up, this oscillator is calibrated quickly against a high precision internal oscillator that consumes more power. This method allows accurate timing to be maintained for system operation in the high temperature environment.
  The MCU comparator used for optical triggering is disabled at high temperatures to prevent unintended triggering of the system, as might be caused by large variations in the input voltage of the comparator at these temperatures. The comparator is re-enabled when the measured temperature drops below a certain threshold so that the capability for optical communication may be restored.

The invention claimed is:

1. An environmental logging system comprising:
   a housing;
   an electronic logging circuit carried by the housing, the logging circuit including:
     an energy source, transducer, and charging circuit interconnecting the energy source and transducer, wherein the energy source is charged by the charging circuit using electricity from the transducer in response to external energy applied to the transducer;
     an electronic control unit (ECU) that includes a processor, memory, and one or more sensors, wherein the ECU operates under power from the energy source to store data from the sensor(s); and
a transmitter coupled to the ECU, wherein the transmitter transmits electromagnetic radiation outside the housing;
wherein the ECU is coupled to the transducer and is configured to detect electricity from the transducer that is indicative of pulses of external energy impinging on the transducer, the ECU being configured to respond to one or more commands encoded by the pulses to change operating states between a sleep state, detection state, and readout state;
wherein the ECU is configured to record data from the one or more sensors when in the detection state and to send data via the transmitter when in the readout state.

2. The environmental logging system set forth in claim 1, wherein the ECU comprises an integrated circuit that includes the processor and memory, wherein the integrated circuit has at least one output coupled to the transmitter to output the data to the transmitter for transmission of the data via the electromagnetic radiation, and has an input coupled to the transducer to receive pulses of electricity indicative of the pulses of external energy impinging on the transducer, whereby the transducer provides charging current to the energy source and operating commands to the processor.

3. The environmental logging system set forth in claim 1, wherein the transducer receives the external energy via optical or radio frequency communication, and the transmitter transmits the data via optical or radio frequency communication.

4. The environmental logging system set forth in claim 1, wherein the logging circuit is sealed within the housing, with the transducer being located in the housing such that it receives the external energy through a portion of the housing that is transmissive to the external energy, and wherein the transmitter is positioned within the housing such that electromagnetic radiation from the transmitter is emitted through the housing.

5. The environmental logging system set forth in claim 4, wherein the housing comprises a tubular shell filled with a polymeric material that is transparent to light and that seals the logging circuit within the shell, and wherein the transducer receives the external energy as light entering the housing through the polymeric material.

6. The environmental logging system set forth in claim 1, further comprising a program stored in the memory that, upon execution by the processor, monitors for receipt of the one or more commands and in response to receiving a specific command, switches into one of a plurality of operating states, wherein the plurality of operating states include the sleep state, the detection state, the readout state, an erase state, a reset state, and an error state.

7. The environmental logging system set forth in claim 6, wherein the program, upon execution by the processor, responds to receipt by the transducer of the external energy at a level above a threshold to switch to an input receiving state during which the processor monitors for the receipt of the one or more commands and switches from the input receiving state to one of the other plurality of operating states.

8. The environmental logging system set forth in claim 1, wherein the logging circuit further includes:
a trigger circuit that operates from the electricity supplied by the energy source and that is coupled to the ECU;
wherein the energy source provides the electricity at different voltage levels depending on a state of charge of the energy source and wherein the processor is rated for normal operation at voltages above a minimum operating voltage and draws more power at some voltages under the minimum operating voltage; and
wherein the trigger circuit inhibits power draw by the processor at voltages under the minimum operating voltage.

9. The environmental logging system set forth in claim 8, wherein the charging circuit includes a power output and the processor includes a power input, and wherein the trigger circuit is connected between the power output of the charging circuit and the power input of the processor and is configured to supply operating power to the processor via the power input when the voltage level of the energy source is at a threshold voltage that is above the minimum operating voltage.

10. The environmental logging system set forth in claim 9, wherein the trigger circuit comprises a comparator that receives power from the energy source and that includes inverting and non-inverting inputs and an output, with the non-inverting input receiving an input signal at a voltage dependent on the voltage of the energy source, the inverting input receiving a reference voltage, and the output being coupled to the non-inverting input to provide positive feedback, and wherein the output of the comparator is coupled to the power input of the processor to provide the operating power to the processor.

11. The environmental logging system set forth in claim 9, wherein the trigger circuit is configured to switch on power to the processor via the power input when the voltage level of the energy source increases past a first hysteresis threshold voltage and to switch off power to the processor via the power input when the voltage level of the energy source decreases below a second hysteresis threshold voltage that is lower than the first hysteresis voltage level, wherein the first and second hysteresis voltage levels are greater than the minimum operating voltage of the processor.

12. An environmental logging system comprising:
a housing;
an electronic logging circuit carried by the housing, the logging circuit including:
an energy source, transducer, and charging circuit interconnecting the energy source and transducer, wherein the energy source is charged by the charging circuit using electricity from the transducer in response to external energy applied to the transducer;
an electronic control unit (ECU) that includes a processor, memory, and one or more sensors, wherein the ECU operates under power from the energy source to store data from the sensor(s);
wherein the housing comprises a tubular shell filled with a polymeric material that seals the logging circuit within the shell, wherein the logging circuit further comprises a pressure sensor sealed within the polymeric material, wherein the polymeric material permits ambient pressure outside the housing to be transferred to the pressure sensor.

13. The environmental logging system set forth in claim 12, wherein the tubular shell is sealed by the polymeric material at an end of the shell with the transducer being located within the polymeric material such that it receives the external energy in the form of light received through the polymeric material as light from an external light source, and wherein the logging circuit further comprises a transmitter positioned in the polymeric material such that the transmitter transmits light pulses containing data out of the housing through the polymeric material.

14. The environmental logging system set forth in claim 12, further comprising a transmitter that transmits data from the processor to an external receiver, wherein the logging circuit is configured to use radio frequency communication for sending and/or receiving power, data, or both.

15. The environmental logging system set forth in claim 12, wherein a spring constant of the polymeric material is on an order of about $2 \times 10^4$ N/m or less.

16. The environmental logging system set forth in claim 12, wherein a spring constant of the polymeric material is at least ten times lower than a spring constant of a diaphragm of the pressure sensor.

17. An environmental logging system comprising:
a housing;
an electronic logging circuit carried by the housing, the logging circuit including:
an energy source, transducer, and charging circuit interconnecting the energy source and transducer, wherein the energy source is charged by the charging circuit using electricity from the transducer in response to external energy applied to the transducer;
an electronic control unit (ECU) that includes a processor, memory, and one or more sensors, wherein the ECU operates under power from the energy source to store data from the sensor(s);
wherein the housing comprises a tubular shell filled with a polymeric material that seals the logging circuit within the shell, wherein the logging circuit further includes:
a trigger circuit that operates from the electricity supplied by the energy source and that is coupled to the ECU;
wherein the energy source provides the electricity at different voltage levels depending on a state of charge of the energy source and wherein the processor is rated for normal operation at voltages above a minimum operating voltage and draws more power at some voltages under the minimum operating voltage; and
wherein the trigger circuit inhibits power draw by the processor at voltages under the minimum operating voltage.

18. The environmental logging system set forth in claim 17, wherein the charging circuit includes a power output and the processor includes a power input, and wherein the trigger circuit is connected between the power output of the charging circuit and the power input of the processor and is configured to supply operating power to the processor via the power input when the voltage level of the energy source is at a threshold voltage that is above the minimum operating voltage.

19. The environmental logging system set forth in claim 18, wherein the trigger circuit comprises a comparator that receives power from the energy source and that includes inverting and non-inverting inputs and an output, with the non-inverting input receiving an input signal at a voltage dependent on the voltage of the energy source, the inverting input receiving a reference voltage, and the output being coupled to the non-inverting input to provide positive feedback, and wherein the output of the comparator is coupled to the power input of the processor to provide the operating power to the processor.

20. The environmental logging system set forth in claim 19, wherein the comparator is a nanowatt comparator having an internal voltage reference connected to the inverting input to supply the reference voltage to the inverting input.

21. The environmental logging system set forth in claim 18, wherein the trigger circuit is configured to switch on power to the processor via the power input when the voltage level of the energy source increases past a first hysteresis threshold voltage and to switch off power to the processor via the power input when the voltage level of the energy source decreases below a second hysteresis threshold voltage that is lower than the first hysteresis voltage level, wherein the first and second hysteresis voltage levels are greater than the minimum operating voltage of the processor.

* * * * *